(12) United States Patent
Shichino

(10) Patent No.: US 8,391,258 B2
(45) Date of Patent: Mar. 5, 2013

(54) COMMUNICATION PARAMETER SETTING METHOD, COMMUNICATING APPARATUS, AND MANAGING APPARATUS FOR MANAGING COMMUNICATION PARAMETERS

(75) Inventor: Takahiro Shichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 347 days.

(21) Appl. No.: 12/377,859

(22) PCT Filed: Oct. 18, 2007

(86) PCT No.: PCT/JP2007/070764
§ 371 (c)(1),
(2), (4) Date: Feb. 17, 2009

(87) PCT Pub. No.: WO2008/050815
PCT Pub. Date: May 2, 2008

(65) Prior Publication Data
US 2010/0232305 A1 Sep. 16, 2010

(30) Foreign Application Priority Data
Oct. 20, 2006 (JP) .................................. 2006-286469

(51) Int. Cl.
*H04W 4/00* (2009.01)
(52) U.S. Cl. .......................... 370/338; 370/255; 370/315
(58) Field of Classification Search .................. 370/255, 370/315, 338
See application file for complete search history.

(56) References Cited

U.S. PATENT DOCUMENTS

| | | |
|---|---|---|
| 4,905,234 A | 2/1990 | Childress et al. |
| 5,261,117 A | 11/1993 | Olson |
| 5,365,523 A | 11/1994 | Derby et al. |
| 5,687,320 A | 11/1997 | Wiley et al. |
| 5,699,495 A | 12/1997 | Snipp |
| 5,886,894 A | 3/1999 | Rakoff |
| 5,937,148 A | 8/1999 | Okazawa |
| 5,996,003 A | 11/1999 | Namikata et al. |

(Continued)

FOREIGN PATENT DOCUMENTS

| | | |
|---|---|---|
| CN | 1481651 | 3/2004 |
| EP | 1107522 | 6/2001 |

(Continued)

OTHER PUBLICATIONS

International Preliminary Report on Patentability dated Apr. 30, 2009 in corresponding International Application No. PCT/JP2007/070764.

(Continued)

*Primary Examiner* — Jason Mattis
(74) *Attorney, Agent, or Firm* — Fitzpatrick, Cella, Harper & Scinto

(57) ABSTRACT

When a plurality of managing apparatuses which manage communication parameters exists, there is a case where the wrong communication parameters are set into a communicating apparatus. When the communication parameters are set between the managing apparatus which manages the communication parameters and the communicating apparatus, if a plurality of managing apparatuses in a setting state of the communication parameters into the communicating apparatus is detected, the managing apparatus in the setting state is notified that the plurality of managing apparatuses in the setting state exists. Whether or not the setting of the communication parameters is continued is discriminated, thereby continuing or stopping the setting of the communication parameters.

13 Claims, 21 Drawing Sheets

U.S. PATENT DOCUMENTS

| | | | |
|---|---|---|---|
| 6,026,303 | A | 2/2000 | Minamisawa |
| 6,065,123 | A | 5/2000 | Chou et al. |
| 6,091,515 | A | 7/2000 | Kimura |
| 6,115,137 | A | 9/2000 | Ozawa et al. |
| 6,148,198 | A | 11/2000 | Anderson et al. |
| 6,157,465 | A | 12/2000 | Suda et al. |
| 6,163,816 | A | 12/2000 | Anderson et al. |
| 6,178,323 | B1 | 1/2001 | Nagata |
| 6,188,898 | B1 | 2/2001 | Phillips |
| 6,308,227 | B1 | 10/2001 | Kumar et al. |
| 6,374,109 | B1 | 4/2002 | Shaheen et al. |
| 6,445,412 | B1 | 9/2002 | Shiohara |
| 6,446,108 | B1 | 9/2002 | Rosenberg et al. |
| 6,477,570 | B1 | 11/2002 | Takayama et al. |
| 6,487,402 | B1 * | 11/2002 | Faus et al. ............... 455/411 |
| 6,493,104 | B1 | 12/2002 | Cromer et al. |
| 6,529,522 | B1 | 3/2003 | Ito et al. |
| 6,553,431 | B1 | 4/2003 | Yamamoto et al. |
| 6,584,311 | B1 | 6/2003 | Sorenson et al. |
| 6,631,008 | B2 | 10/2003 | Aoki |
| 6,633,757 | B1 | 10/2003 | Hermann et al. |
| 6,650,795 | B1 | 11/2003 | Motta |
| 6,771,896 | B2 | 8/2004 | Tamura et al. |
| 6,778,827 | B1 | 8/2004 | Anderson et al. |
| 6,782,260 | B2 | 8/2004 | Nakakita et al. |
| 6,792,611 | B2 | 9/2004 | Honishi et al. |
| 6,813,037 | B1 | 11/2004 | Collard |
| 6,816,067 | B2 | 11/2004 | Patton |
| 6,820,126 | B2 | 11/2004 | Sibecas et al. |
| 6,839,757 | B1 | 1/2005 | Romano et al. |
| 6,862,594 | B1 | 3/2005 | Saulpaugh et al. |
| 6,876,643 | B1 | 4/2005 | Aggarwal et al. |
| 6,920,506 | B2 | 7/2005 | Barnard et al. |
| 6,985,740 | B2 | 1/2006 | Shyy et al. |
| 6,986,046 | B1 | 1/2006 | Tuvell et al. |
| 7,024,204 | B2 | 4/2006 | Nakakita et al. |
| 7,043,244 | B1 | 5/2006 | Fauconnier |
| 7,065,526 | B2 | 6/2006 | Wissner et al. |
| 7,072,053 | B2 | 7/2006 | Guddanti |
| 7,075,919 | B1 | 7/2006 | Wendt et al. |
| 7,088,691 | B2 | 8/2006 | Fujita |
| 7,103,357 | B2 | 9/2006 | Kirani et al. |
| 7,120,129 | B2 | 10/2006 | Ayyagari et al. |
| 7,190,471 | B2 | 3/2007 | Sandfort et al. |
| 7,239,416 | B2 | 7/2007 | Ohmura et al. |
| 7,256,906 | B2 | 8/2007 | Nakajima |
| 7,292,843 | B2 | 11/2007 | Ishikawa et al. |
| 7,295,524 | B1 | 11/2007 | Gray et al. |
| 7,313,399 | B2 | 12/2007 | Rhee et al. |
| 7,324,644 | B2 | 1/2008 | Saito |
| 7,324,805 | B2 | 1/2008 | Nakakita et al. |
| 7,356,011 | B1 | 4/2008 | Waters et al. |
| 7,359,950 | B2 | 4/2008 | Choi et al. |
| 7,372,485 | B1 | 5/2008 | Bodnar et al. |
| 7,430,433 | B2 | 9/2008 | Choi et al. |
| 7,440,459 | B2 | 10/2008 | Casati |
| 7,461,130 | B1 | 12/2008 | AbdelAziz et al. |
| 7,477,914 | B2 * | 1/2009 | Jalil et al. ............... 455/524 |
| 7,502,855 | B2 | 3/2009 | Swanson et al. |
| 7,506,047 | B2 | 3/2009 | Wiles, Jr. |
| 7,519,697 | B2 | 4/2009 | Matsukura |
| 7,523,212 | B2 | 4/2009 | Woolf et al. |
| 7,535,588 | B2 | 5/2009 | Wang et al. |
| 7,555,264 | B2 | 6/2009 | Ishiwata et al. |
| 7,583,645 | B2 | 9/2009 | Qi et al. |
| 7,600,050 | B2 | 10/2009 | Aritomi |
| 7,603,710 | B2 | 10/2009 | Harvey et al. |
| 7,664,081 | B2 | 2/2010 | Luoma et al. |
| 7,720,477 | B2 | 5/2010 | Moritomo et al. |
| 7,756,994 | B2 | 7/2010 | Yumoto |
| 7,882,196 | B2 | 2/2011 | Fujii et al. |
| 7,882,234 | B2 | 2/2011 | Watanabe et al. |
| 7,929,947 | B2 | 4/2011 | Shimura et al. |
| 2001/0003191 | A1 | 6/2001 | Kovacs et al. |
| 2001/0029530 | A1 | 10/2001 | Naito et al. |
| 2001/0029531 | A1 | 10/2001 | Ohta |
| 2002/0004872 | A1 | 1/2002 | Ono |
| 2002/0026492 | A1 | 2/2002 | Fujita |
| 2002/0030840 | A1 | 3/2002 | Itaki et al. |
| 2002/0032748 | A1 | 3/2002 | Myojo |
| 2002/0041388 | A1 | 4/2002 | Aoki |
| 2002/0046228 | A1 | 4/2002 | Scheifler et al. |
| 2002/0048455 | A1 | 4/2002 | Tamura et al. |
| 2002/0062407 | A1 | 5/2002 | Tateyama et al. |
| 2002/0075229 | A1 | 6/2002 | Ito et al. |
| 2002/0093682 | A1 | 7/2002 | Nakajima |
| 2002/0097423 | A1 | 7/2002 | Qiao |
| 2002/0105678 | A1 | 8/2002 | Shiraiwa |
| 2002/0120750 | A1 | 8/2002 | Nidd |
| 2002/0138671 | A1 | 9/2002 | Struble |
| 2002/0147819 | A1 | 10/2002 | Miyakoshi et al. |
| 2002/0161740 | A1 | 10/2002 | Nakamura et al. |
| 2002/0180879 | A1 | 12/2002 | Shiohara |
| 2002/0194417 | A1 | 12/2002 | Suzuki et al. |
| 2003/0002073 | A1 | 1/2003 | Berkema et al. |
| 2003/0003933 | A1 | 1/2003 | Deshpande et al. |
| 2003/0014446 | A1 | 1/2003 | Simpson et al. |
| 2003/0037033 | A1 | 2/2003 | Nyman et al. |
| 2003/0041102 | A1 | 2/2003 | Simpson et al. |
| 2003/0050963 | A1 | 3/2003 | Lamming et al. |
| 2003/0056133 | A1 | 3/2003 | Talley |
| 2003/0065851 | A1 | 4/2003 | Layman |
| 2003/0078965 | A1 | 4/2003 | Cocotis et al. |
| 2003/0081237 | A1 | 5/2003 | Ogiwara et al. |
| 2003/0081251 | A1 | 5/2003 | Tanaka et al. |
| 2003/0097291 | A1 | 5/2003 | Freedman |
| 2003/0100335 | A1 | 5/2003 | Gassho et al. |
| 2003/0123840 | A1 | 7/2003 | Fujinami |
| 2003/0124979 | A1 | 7/2003 | Tanada et al. |
| 2003/0142016 | A1 | 7/2003 | Pickup |
| 2003/0162556 | A1 | 8/2003 | Libes |
| 2003/0177219 | A1 | 9/2003 | Taib et al. |
| 2003/0185613 | A1 | 10/2003 | Guddanti |
| 2003/0191814 | A1 | 10/2003 | Tran |
| 2003/0208595 | A1 | 11/2003 | Gouge et al. |
| 2004/0003060 | A1 | 1/2004 | Asoh et al. |
| 2004/0012192 | A1 | 1/2004 | Dixon, III et al. |
| 2004/0019671 | A1 | 1/2004 | Metz |
| 2004/0019681 | A1 | 1/2004 | Nakamura et al. |
| 2004/0024831 | A1 | 2/2004 | Yang et al. |
| 2004/0039811 | A1 | 2/2004 | Nakamura et al. |
| 2004/0076300 | A1 | 4/2004 | Ishidoshiro |
| 2004/0095469 | A1 | 5/2004 | Lin |
| 2004/0102192 | A1 | 5/2004 | Serceki |
| 2004/0102977 | A1 | 5/2004 | Metzler et al. |
| 2004/0114521 | A1 | 6/2004 | Sugaya |
| 2004/0136338 | A1 | 7/2004 | Lin et al. |
| 2004/0137855 | A1 | 7/2004 | Wiley et al. |
| 2004/0150724 | A1 | 8/2004 | Nozaki et al. |
| 2004/0162027 | A1 | 8/2004 | Chang |
| 2004/0169730 | A1 | 9/2004 | Tamura et al. |
| 2004/0187157 | A1 | 9/2004 | Chong et al. |
| 2004/0198366 | A1 | 10/2004 | Crocker et al. |
| 2004/0203373 | A1 | 10/2004 | Ogino et al. |
| 2004/0215752 | A1 | 10/2004 | Satapati et al. |
| 2004/0223503 | A1 | 11/2004 | Lynch et al. |
| 2004/0255000 | A1 | 12/2004 | Simionescu et al. |
| 2004/0259552 | A1 | 12/2004 | Ihori et al. |
| 2004/0260800 | A1 | 12/2004 | Gu et al. |
| 2005/0001024 | A1 | 1/2005 | Kusaka et al. |
| 2005/0014467 | A1 | 1/2005 | Ishiwata et al. |
| 2005/0021684 | A1 | 1/2005 | Hsue et al. |
| 2005/0033816 | A1 | 2/2005 | Yamaguchi et al. |
| 2005/0060364 | A1 | 3/2005 | Kushwaha et al. |
| 2005/0060419 | A1 | 3/2005 | Fujii et al. |
| 2005/0066197 | A1 | 3/2005 | Hirata et al. |
| 2005/0075084 | A1 | 4/2005 | Salokannel et al. |
| 2005/0080796 | A1 | 4/2005 | Midgley |
| 2005/0086273 | A1 | 4/2005 | Loebbert et al. |
| 2005/0096031 | A1 | 5/2005 | Sugaya et al. |
| 2005/0097356 | A1 | 5/2005 | Zilliacus et al. |
| 2005/0128968 | A1 | 6/2005 | Yang |
| 2005/0130647 | A1 | 6/2005 | Matsuda et al. |
| 2005/0160261 | A1 | 7/2005 | Barry et al. |
| 2005/0174357 | A1 | 8/2005 | Wang |
| 2005/0183115 | A1 | 8/2005 | Maruyama et al. |
| 2005/0201557 | A1 | 9/2005 | Ishidoshiro |

| | | | | | | |
|---|---|---|---|---|---|---|
| 2005/0232209 A1 | 10/2005 | Buckley et al. | | JP | 11146030 | 5/1999 |
| 2005/0238172 A1 | 10/2005 | Tamura | | JP | 11239312 | 8/1999 |
| 2005/0239438 A1 | 10/2005 | Naghian | | JP | 2001014119 | 1/2001 |
| 2005/0256934 A1 | 11/2005 | Motoyama | | JP | 2001144767 | 5/2001 |
| 2005/0270556 A1 | 12/2005 | Shimamura | | JP | 2002094531 | 3/2002 |
| 2006/0025076 A1 | 2/2006 | Yu | | JP | 2002094604 | 3/2002 |
| 2006/0031438 A1 | 2/2006 | Tokuhashi et al. ............ 709/223 | | JP | 2002140304 | 5/2002 |
| 2006/0033812 A1 | 2/2006 | Yoshida et al. | | JP | 2002159053 | 5/2002 |
| 2006/0039329 A1 | 2/2006 | Samuel et al. | | JP | 2002185462 | 6/2002 |
| 2006/0080417 A1 | 4/2006 | Boutboul et al. | | JP | 2002244829 | 8/2002 |
| 2006/0084456 A1 | 4/2006 | Dunko et al. | | JP | 2002330142 | 11/2002 |
| 2006/0111103 A1 | 5/2006 | Jeong et al. | | JP | 2002359623 | 12/2002 |
| 2006/0128305 A1 | 6/2006 | Delalat | | JP | 2002373130 | 12/2002 |
| 2006/0133414 A1 | 6/2006 | Luoma et al. | | JP | 2003085548 | 3/2003 |
| 2006/0148516 A1 | 7/2006 | Reddy et al. | | JP | 2003091467 | 3/2003 |
| 2006/0153385 A1 | 7/2006 | Klein | | JP | 2003163668 | 6/2003 |
| 2006/0155827 A1 | 7/2006 | Prehofer et al. | | JP | 2003218875 | 7/2003 |
| 2006/0158518 A1 | 7/2006 | Sakai | | JP | 2003-229867 | 8/2003 |
| 2006/0183477 A1 | 8/2006 | Bocking et al. | | JP | 2004048493 | 2/2004 |
| 2006/0187865 A1 | 8/2006 | Sakai ............................ 370/311 | | JP | 2004110844 | 4/2004 |
| 2006/0200564 A1 | 9/2006 | Watanabe et al. ............ 709/227 | | JP | 20004129042 | 4/2004 |
| 2006/0206592 A1 | 9/2006 | Fujii et al. | | JP | 2004215232 | 7/2004 |
| 2006/0212610 A1 | 9/2006 | Nago et al. | | JP | 2004-328289 | 11/2004 |
| 2006/0212611 A1 | 9/2006 | Fujii et al. | | JP | 2004320162 | 11/2004 |
| 2006/0242304 A1 | 10/2006 | Hirose et al. | | JP | 2004328289 | 11/2004 |
| 2006/0246941 A1 | 11/2006 | Watanabe et al. | | JP | 2005020112 | 1/2005 |
| 2006/0246946 A1 | 11/2006 | Moritomo et al. | | JP | 2005027280 | 1/2005 |
| 2006/0246947 A1 | 11/2006 | Fujii et al. | | JP | 2005065102 | 3/2005 |
| 2006/0252413 A1 | 11/2006 | Ikeda | | JP | 2005-311653 | 4/2005 |
| 2006/0268743 A1 | 11/2006 | Yoshida | | KR | 1989-0001306 | 3/1989 |
| 2006/0268744 A1 | 11/2006 | Sakai et al. | | KR | 10-2004-0075702 | 8/2004 |
| 2006/0291404 A1 | 12/2006 | Thubert et al. | | KR | 10-2006-0007009 | 1/2006 |
| 2007/0002867 A1 | 1/2007 | Shitano et al. | | WO | 0137497 | 5/2001 |
| 2007/0030516 A1 | 2/2007 | Tsuji et al. | | WO | 0139538 | 5/2001 |
| 2007/0043844 A1 | 2/2007 | Sakai | | WO | 0193514 | 12/2001 |
| 2007/0060213 A1 | 3/2007 | Yoshida | | WO | 03067813 | 8/2003 |
| 2007/0064634 A1* | 3/2007 | Huotari et al. ................. 370/310 | | WO | 2004/082214 | 9/2004 |
| 2007/0094414 A1 | 4/2007 | Das | | WO | 2004095778 | 11/2004 |
| 2007/0109989 A1 | 5/2007 | Nakagawa et al. | | WO | 2004098128 | 11/2004 |
| 2007/0111796 A1* | 5/2007 | C. Giaimo et al. .............. 463/42 | | WO | 2005013569 | 2/2005 |
| 2007/0112961 A1 | 5/2007 | Brun et al. | | WO | 2005034434 | 4/2005 |
| 2007/0115950 A1 | 5/2007 | Karaoguz et al. | | WO | 2006106393 | 10/2006 |
| 2007/0120955 A1 | 5/2007 | Shimosato | | WO | 2007007758 | 1/2007 |
| 2007/0153317 A1 | 7/2007 | Klein | | WO | 2007108545 | 9/2007 |
| 2007/0174436 A1 | 7/2007 | Maekawa et al. | | | | |
| 2007/0189322 A1 | 8/2007 | Hirose | | | | |

OTHER PUBLICATIONS

International Search Report mailed May 2, 2008 in corresponding International Application No. PCT/JP2007/070764.
European Search Report dated Aug. 25, 2006 in EPO Application No. 06113209.8-2416.
European Search Report dated Sep. 1, 2006 in EPO Application No. 06252253.7-2413.
European Search Report dated Sep. 17, 2010 in EPO Application No. 04728396.5-2412.
European Search Report dated Sep. 23, 2010 in EPO Application No. 10168638.4-2412.
Ritchie, et al., "UPnP AV Architecture: 0.83", For Universal Plug and Play Version 1.0 Status: Preliminary Design (TPD), Design Document Microsoft, (Jun. 12, 2002) pp. 1-22, XP002271673.
A. Ayyagari, "Bluetooth ESDP for UPnP", Bluetooth Doc [Online] (Feb. 1, 2001), pp. 1-59, XP002394106.
M. Kangas, "Authentication and Authorization in Universal Plug and Play Home Networks" Research Seminar on Telecommunications Software, (2002), pp. 1-12, XP007900020.
Corcoran, et al., "Wireless Transfer of Images From a Digital Camera to the Internet Via a GSM Mobile Phone", IEEE Transactions on Consumer Electronics, vol. 47, No. 3, Aug. 1, 2001, pp. 542-547, XP 002268535.
"The Windows XP Wireless Zero Configuration Service", Microsoft Corporation, Nov. 2002 (available at http://technet.microsoft.com/en-us/library/bb878157.aspx).
Mango, "Guide to Bluetooth Mobile Phone", China Academic Journal Electronic Publishing House (2002) (in Chinese with English Translation).
Office Action dated Oct. 26, 2007 in JP Application 2003-119052.
Office Action dated Nov. 2, 2007 in JP Application 2003-118834.

| | | | |
|---|---|---|---|
| 2007/0190973 A1 | 8/2007 | Goto et al. | |
| 2007/0202883 A1 | 8/2007 | Herve et al. | |
| 2007/0217332 A1 | 9/2007 | Nakahara | |
| 2007/0220255 A1 | 9/2007 | Igarashi | |
| 2007/0223046 A1 | 9/2007 | Shiraiwa | |
| 2007/0223398 A1 | 9/2007 | Luo et al. | |
| 2007/0223670 A1 | 9/2007 | Ido | |
| 2007/0233834 A1 | 10/2007 | Hattori et al. | |
| 2007/0258415 A1 | 11/2007 | Lu et al. | |
| 2008/0026795 A1 | 1/2008 | Fujii | |
| 2008/0089300 A1 | 4/2008 | Yee ............................... 370/338 |
| 2008/0261580 A1 | 10/2008 | Wallentin et al. | |
| 2009/0025081 A1 | 1/2009 | Quigley et al. | |
| 2009/0088133 A1 | 4/2009 | Orlassino | |
| 2009/0177801 A1 | 7/2009 | Chambers, Jr. et al. | |
| 2009/0179991 A1 | 7/2009 | Mohammad | |
| 2009/0241072 A1 | 9/2009 | Chaudhri et al. | |
| 2009/0323108 A1 | 12/2009 | Shimma | |

FOREIGN PATENT DOCUMENTS

| | | |
|---|---|---|
| EP | 1117221 | 7/2001 |
| EP | 1229724 | 8/2002 |
| EP | 1 307 003 | 2/2003 |
| EP | 1458206 | 9/2004 |
| EP | 1487155 | 12/2004 |
| EP | 1 511 225 | 3/2005 |
| EP | 1617596 | 1/2006 |
| GB | 2354832 | 4/2001 |
| JP | 6350652 | 12/1994 |
| JP | 10145276 | 5/1998 |
| JP | 10341303 | 12/1998 |
| JP | 11008625 | 1/1999 |
| JP | 11068786 | 3/1999 |

Office Action dated Dec. 5, 2008 in JP Application 2008-024989.
Office Action dated Jul. 13, 2009 in JP Application 2005-130480.
Office Action dated Jan. 18, 2010 in JP Application 2005-130480.
Office Action dated Aug. 6, 2010 in JP Application 2008-194012.
Office Action dated Sep. 1, 2008 in JP Application 2005-130478.
Office Action dated May 9, 2008 in CN Application 2004800107624.
Office Action dated Mar. 9, 2007 in CN Application 2004800107431.
International Search Report dated Jul. 21, 2004 in PCT Application No. PCT/JP2004/005588.
Office Action dated Oct. 29, 2010 in JP Application 2008-194013.
Office Action dated Jun. 23, 2008 in U.S. Appl. No. 11/551,174.

* cited by examiner

FIG. 4

| | RESERVATION AREA | | |
|---|---|---|---|
| 400 | MODE | | |
| | 1 | | |

| 500 | BASE STATION | 1 | 2 | 3 |
|---|---|---|---|---|
| 501 | MAC | aa:aa:aa:aa:aa:aa | bb:bb:bb:bb:bb:bb | |
| 502 | SSID | a | a | |
| 503 | OPERATING MODE | 1 | 1 | |
| 504 | NOTIFICATION FLAG | 0 | 0 | |

| 600 | MANAGING APPARATUS | OWN APPARATUS | 2 | 3 |
|---|---|---|---|---|
| 601 | MAC | cc:cc:cc:cc:cc:cc | dd:dd:dd:dd:dd:dd | |
| 602 | SSID | a | a | |
| 603 | ENCRYPTING SYSTEM | WPA | WPA | |
| 604 | ENCRYPTION KEY | 12345678 | 12345678 | |
| 605 | OPERATING MODE | 1 | 1 | |

FIG. 11

| RESERVATION AREA | | |
|---|---|---|
| SETTING | GROUP | |
| 1 | 1 | |

| BASE STATION | 1 | 2 | 3 |
|---|---|---|---|
| MAC | aa:aa:aa:aa:aa:aa | bb:bb:bb:bb:bb:bb | |
| SSID | a | a | |
| MODE | 1 | 1 | |
| GROUP | 1 | 1 | |

500, 501, 502, 503, 1200

- 1900 — S/N DIFFERENCE STORING UNIT
- 202 RAM
- 206 — TIMER
- 205 — BASE STATION INFORMATION UNIT

2000 — ... 1900 ... 2001

| S/N RATIO | MIN. VALUE OF DIFFERENCES |
|---|---|
| 0×20-0×17 | 0×05 |
| 0×16-0×12 | 0×04 |
| 0×11-0×07 | 0×03 |
| 0×07- | 0×02 |

205

| | BASE STATION | 1 | 2 | 3 |
|---|---|---|---|---|
| 500 | | | | |
| 501 | MAC | aa:aa:aa:aa:aa:aa | bb:bb:bb:bb:bb:bb | |
| 502 | SSID | a | b | |
| 503 | MODE | 1 | 1 | |
| 504 | NOTIFICATION | 0 | 0 | |
| 2100 | S/N RATIO | 0×16 | 0×f | |

COMMUNICATION PARAMETER SETTING METHOD, COMMUNICATING APPARATUS, AND MANAGING APPARATUS FOR MANAGING COMMUNICATION PARAMETERS

TECHNICAL FIELD

The invention relates to a technique which is used when communication parameters are set between a managing apparatus for managing the communication parameters and a communicating apparatus.

BACKGROUND ART

To make radio communication, it is necessary to set various radio parameters into an apparatus. For example, in a wireless LAN which conforms with the IEEE802.11 Standard, it is necessary to set the radio parameters such as SSID as a network identifier, encrypting system, encryption key, and the like.

In order to set the radio parameters into the radio apparatus, a personal computer (PC) is connected to the radio apparatus by a wire and the radio parameters are set into the radio apparatus by the operation of the PC. In the wireless LAN, there are base stations serving as access points and radio terminals serving as user terminals and the user needs to connect those apparatuses to the PC and set the radio parameters.

Since the setting of the radio parameters into the radio apparatus is troublesome, it is demanded to realize a simple setting method of the radio parameters.

Such a construction that the apparatuses in which a button for setting the radio parameters has been operated are automatically connected in a wireless manner and the operation which is executed at the time of the wireless connection is simplified has been disclosed in U.S. Patent Application Publication No. US-2006-0200564 (Japanese Patent Application Laid-Open No. 2004-328289).

When the setting of the radio apparatus is made by using the PC, there is a case where if a plurality of PCs exists, the user's desired radio parameters cannot be set into the radio terminal. For example, a case where a radio parameter 1 is set into a base station 1 by using a PC 1, a radio parameter 2 is set into a base station 2 by using a PC 2, and the PCs 1 and 2 store and manage the set radio parameters is considered.

It is now assumed that the user who owns the radio terminal wants to set the radio parameters set in the base station 1 into his radio terminal. However, since there are two PCs in which the radio parameters have been stored and managed, the user does not know which one of the PCs should be used to set the radio parameters. If the user has erroneously set the radio parameters by using the PC 2, he cannot make data communication even when he connects his PC to the base station 1.

It is now assumed that in order to realize the easy setting of the radio parameters, the radio terminal is constructed so that the radio parameters can be set by the PC in a wireless manner and the setting of the radio parameters is activated by the setting operation (for example, depression of a setting button) in each of the PC and the radio terminal. At this time, if another user executes the setting operation by using the adjacent PC, there is a case where the radio terminal sets the radio parameters which are managed by the adjacent PC. In such a case, the wrong radio parameters are also set.

DISCLOSURE OF THE INVENTION

It is an object of the invention to solve a problem which occurs when a plurality of managing apparatuses for managing communication parameters exists.

Other objects of the invention will be apparent from the following specification and drawings.

The invention provides a communication parameter setting method of setting communication parameters between a managing apparatus for managing the communication parameters and a communicating apparatus, comprising: a detecting step of detecting the managing apparatus in a setting state of the communication parameters into the communicating apparatus; a notifying step of, if a plurality of managing apparatuses in the setting state is detected in the detecting step, notifying the managing apparatuses in the setting state that the plurality of managing apparatuses in the setting state exists; a discriminating step of discriminating whether or not the setting of the communication parameters is continued; and a step of continuing or stopping the setting of the communication parameters according to the discrimination in the discriminating step.

The invention also provides a communicating apparatus comprising: a detecting unit configured to detect a managing apparatus in a setting state of communication parameters into the communicating apparatus; and a notifying unit configured to, if a plurality of managing apparatuses in the setting state is detected by the detecting unit, notify the managing apparatuses in the setting state that the plurality of managing apparatuses in the setting state exists.

The invention also provides a managing apparatus for managing communication parameters which are set into a communicating apparatus, comprising: a detecting unit configured to detect another managing apparatus in a setting state of the communication parameters; a confirming unit configured to confirm the communication parameters which are managed by the other managing apparatus detected by the detecting unit; and a discriminating unit configured to discriminate whether or not the setting of the communication parameters is continued according to a result of the confirmation by the confirming unit.

Further features of the present invention will become apparent from the following description of exemplary embodiments with reference to the attached drawings.

BRIEF DESCRIPTION OF THE DRAWINGS

FIG. 4 shows a reservation area of a beacon which is transmitted from a base station in the embodiment.

FIG. 5 shows a base station information unit in the embodiment.

FIG. 6 shows a managing apparatus information unit in the embodiment.

FIG. 11 shows a reservation area of a beacon which is transmitted from a base station in the second embodiment.

FIG. 12 shows a base station information unit in the second embodiment.

BEST MODE FOR CARRYING OUT THE INVENTION

First Embodiment

Figure 1:
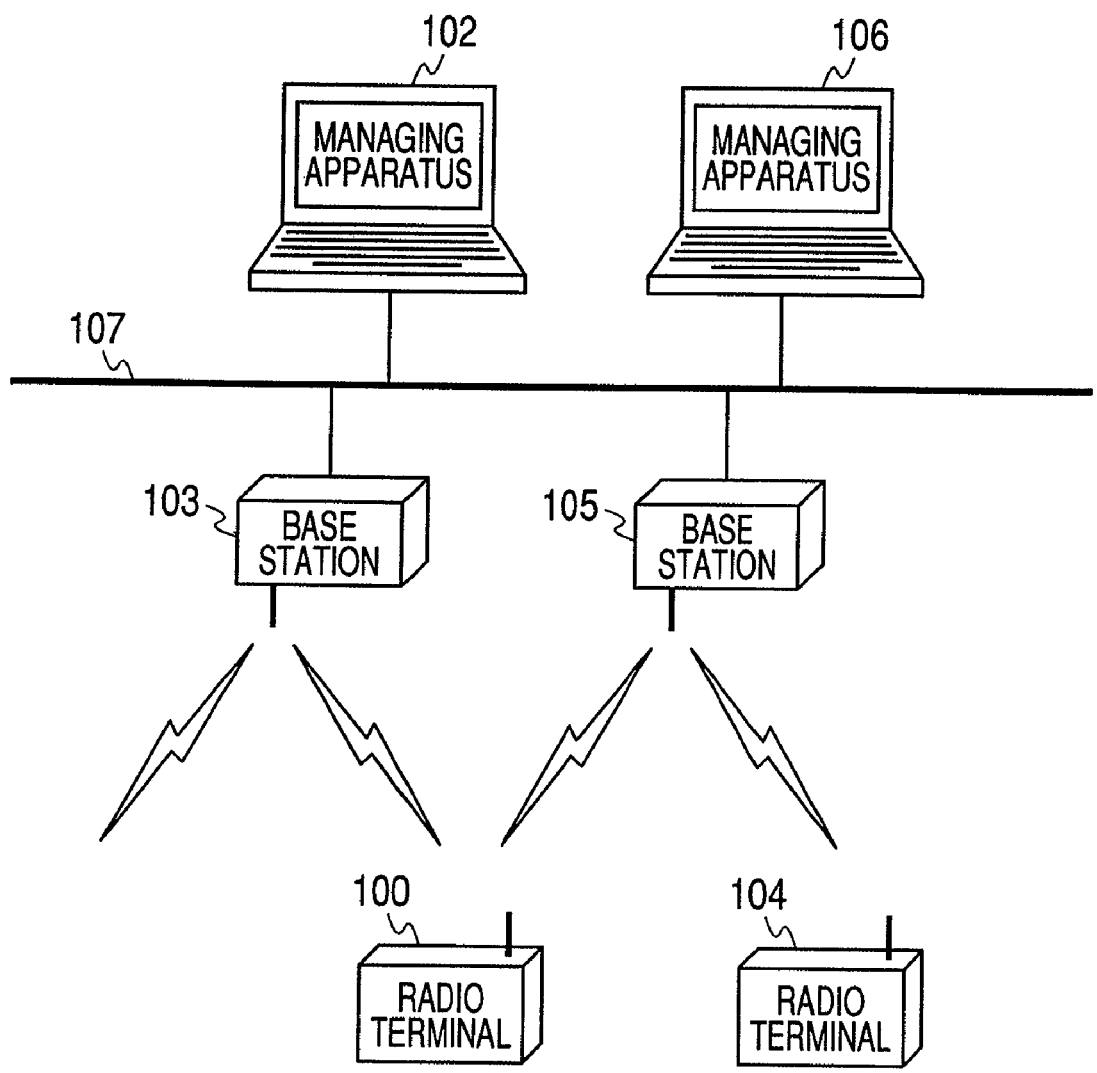
FIG. 1 is a system constructional diagram in the first to sixth embodiments.

FIG. 1 is a system constructional diagram in the embodiment.

In FIG. 1, base stations 103 and 105 and managing apparatuses 102 and 106 are connected to a wired LAN. The base stations 103 and 105 and radio terminals 100 and 104 mutually communicate in a wireless manner by wireless LAN communication which conforms with the IEEE802.11. The radio terminal 100 is located in a communication area of the base stations 103 and 105.

The managing apparatus 102 manages radio parameters which are used in the base station 103 and notifies the radio terminal of the radio parameters. The radio parameters which are managed by the managing apparatus 102 are radio network information such as SSID (Service Set Identifier) as an identifier of a radio network which is formed by the base station 103, encrypting system and encryption key which are used by the base station 103, and the like. The managing apparatus 106 manages radio parameters which are used in the base station 105 and notifies the radio terminal of the radio parameters. The radio parameters which are managed by the managing apparatus 106 are radio network information such as SSID as an identifier of a radio network which is formed by the base station 105, encrypting system and encryption key which are used by the base station 105, and the like.

Figure 2:
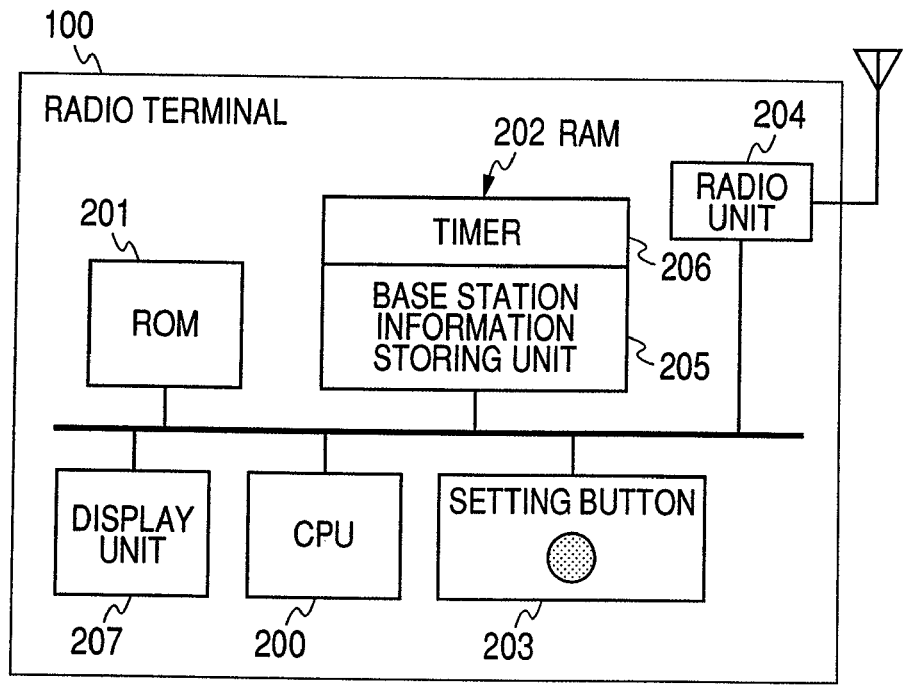
FIG. 2 is a constructional diagram of a radio terminal in the embodiment.

FIG. 2 shows a construction of each of the radio terminals 100 and 104 in the embodiment.

A CPU 200 controls functions of the radio terminal according to programs stored in a ROM 201. A program for making the radio terminal operative has been stored in the ROM 201. The CPU 200 executes the programs stored in the ROM 201, so that the radio terminal executes the operation, which will be described hereinafter. A RAM 202 is used as a memory area which is necessary upon operating. A base station information unit 205 which stores base station information and a timer 206 are included in the RAM 202.

A setting button 203 is used when the radio parameters are set by the switch operation. When the setting button 203 is pressed by the user, the radio terminal starts the operation, which will be described hereinafter, for the radio parameter setting by control of the CPU 200. A radio unit 204 transmits and receives data in a wireless manner. In the embodiment, the radio unit 204 makes the wireless LAN communication which conforms with the IEEE802.11. A display unit 207 displays various information and notifies the user of them.

Figure 3:
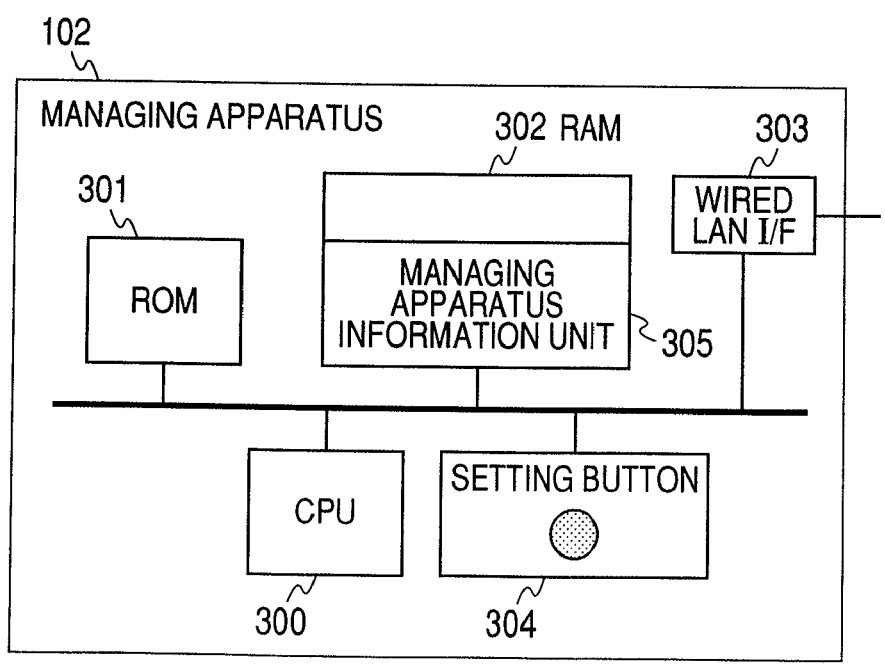
FIG. 3 is a constructional diagram of a managing apparatus in the embodiment.

FIG. 3 shows a construction of each of the managing apparatuses 102 and 106 in the embodiment.

A CPU 300 controls functions of the managing apparatuses according to programs stored in a ROM 301. A program for making the managing apparatuses operative has been stored in the ROM 301. The CPU 300 executes the programs stored in the ROM 301, so that the managing apparatuses 102 and 106 execute the operation, which will be described hereinafter. A RAM 302 is used as a memory area which is necessary upon operating. A managing apparatus information unit 305 which stores the information of the managing apparatuses is included in the RAM 302.

A setting button 304 is used when the radio parameters are set by the switch operation. When the setting button 304 is pressed by the user, the managing apparatus starts the operation, which will be described hereinafter, for the radio parameter setting by control of the CPU 300.

A wired LAN I/F 303 is an interface unit for communicating data through a wired LAN 107.

FIG. 4 shows an example of a reservation area of an alarm signal which is transmitted from the base station in the embodiment.

Each of the base stations 103 and 105 transmits the alarm signal (beacon) and notifies of information regarding a radio network which is formed by the base station. A reservation area of an unused area is included in the beacon. In the embodiment, a part of this reservation area is used as an area for inserting information showing an operating mode of the base station.

If a mode area 400 is equal to "1", this means that the base station is operating in a setting mode. If the mode area 400 is equal to "0", this means that the base station is operating in a normal mode.

FIG. 5 shows a construction of the base station information unit 205 stored in the RAM 202 of each of the radio terminals 100 and 104.

Reference numeral 500 denotes an index number to identify the base station; 501 an MAC (Media Access Control) address of the base station; and 502 an SSID of the base station. The SSID 502 is an identifier of the radio network which is formed by the base station. Reference numeral 503 denotes an operating mode showing in which one of the normal mode and the setting mode the base station is operating. In the normal mode, "0" is stored and, in the setting mode, "1" is stored in 503. Reference numeral 504 denotes a notification flag showing whether or not an overlap notification, which will be described hereinafter, has been made to the corresponding base station in the case where there is a plurality of base stations in the setting mode. If the notification has been made, "1" is stored. If the notification is not made, "0" is stored.

FIG. 6 shows a construction of the managing apparatus information unit 305 which is stored in the RAM 302 in each of the managing apparatuses 102 and 106.

Reference numeral 600 denotes an index number for identifying the managing apparatus. Its own apparatus also becomes a management target. Reference numeral 601 denotes an MAC address of the managing apparatus; 602 an SSID which is managed by the managing apparatus; 603 an encrypting system which is managed by the managing apparatus; and 604 an encryption key which is managed by the managing apparatus. The base station as a management target is notified of the SSID, encrypting system, and encryption key which are managed by the managing apparatus and they are set into the base station. Reference numeral 605 denotes an operating mode of the managing apparatus. In the normal mode, "0" is stored and, in the setting mode, "1" is stored in 605.

Figure 7:
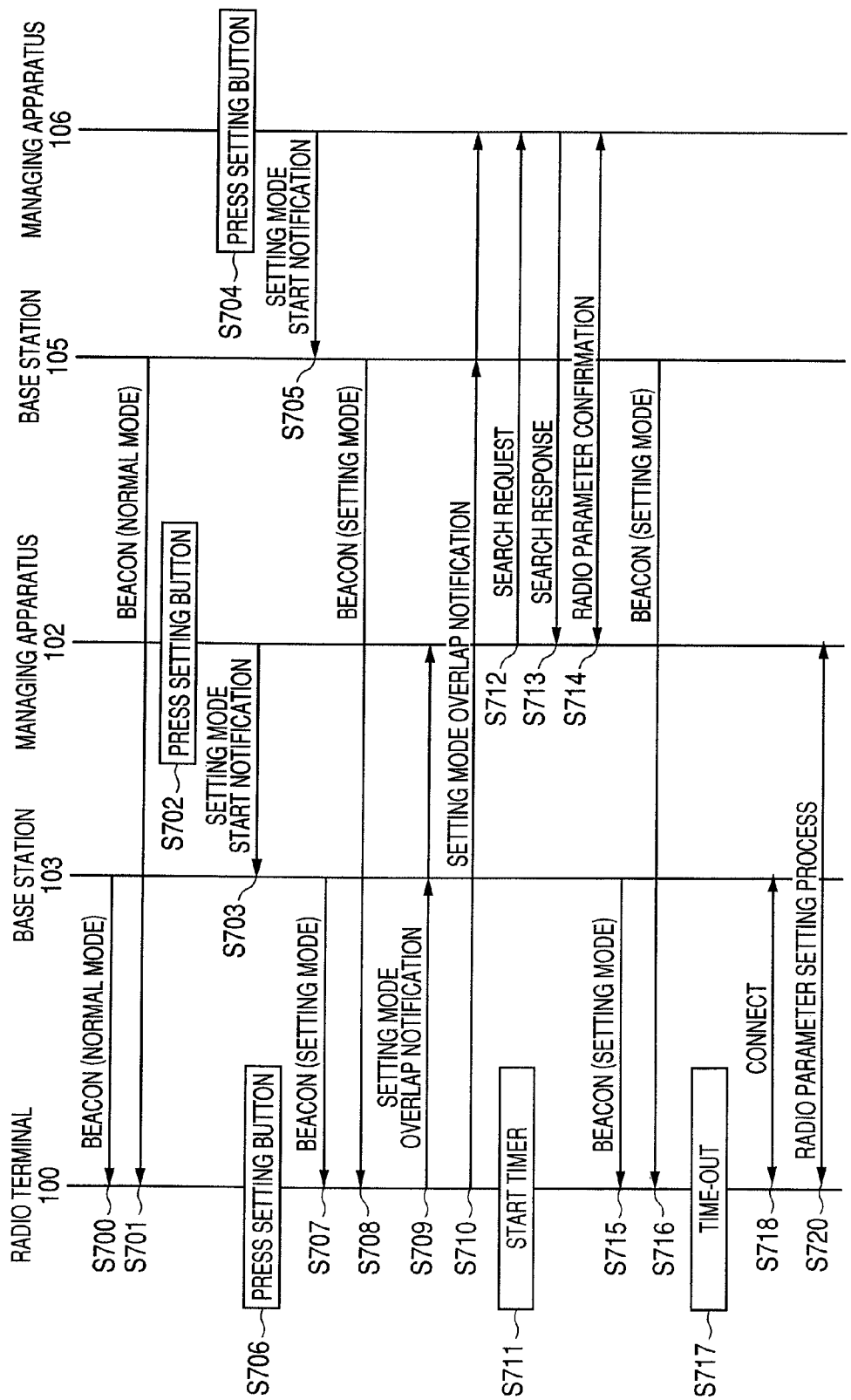
FIG. 7 is a sequence diagram in the first embodiment.
Figure 8:
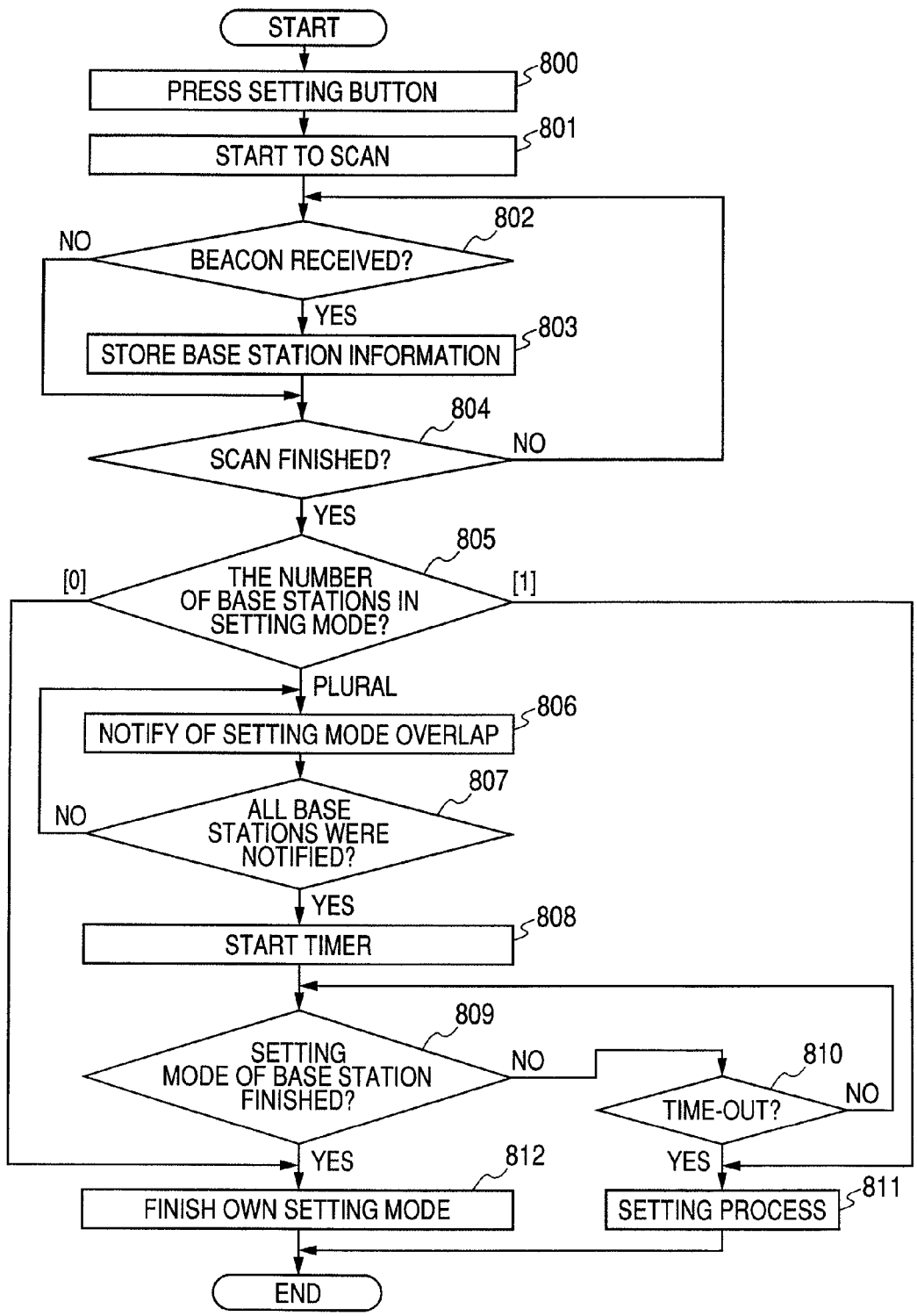
FIG. 8 is a flowchart of the radio terminal in the first embodiment.
Figure 9:
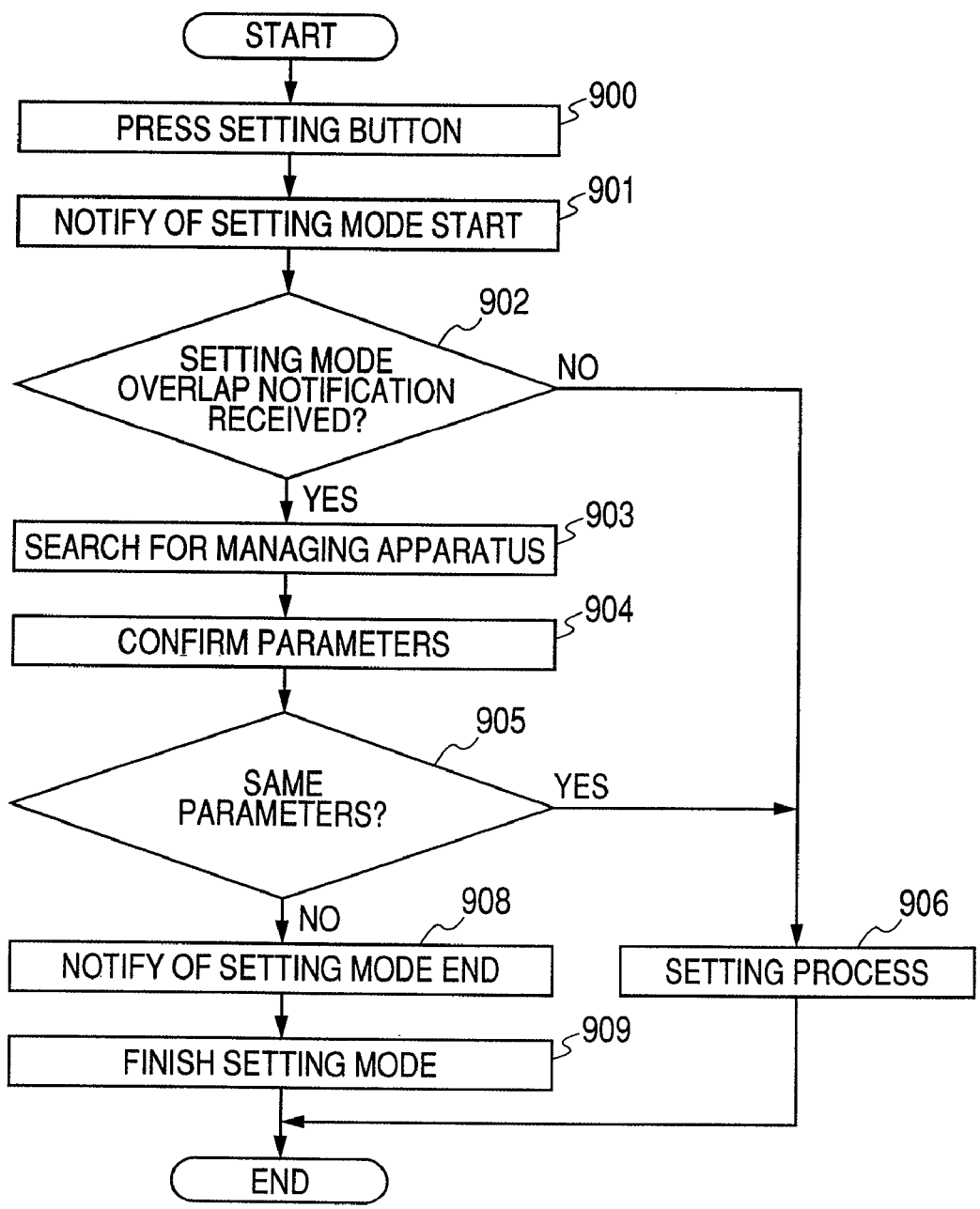
FIG. 9 is a flowchart of a radio parameter setting managing apparatus in the first embodiment.
Figure 10:
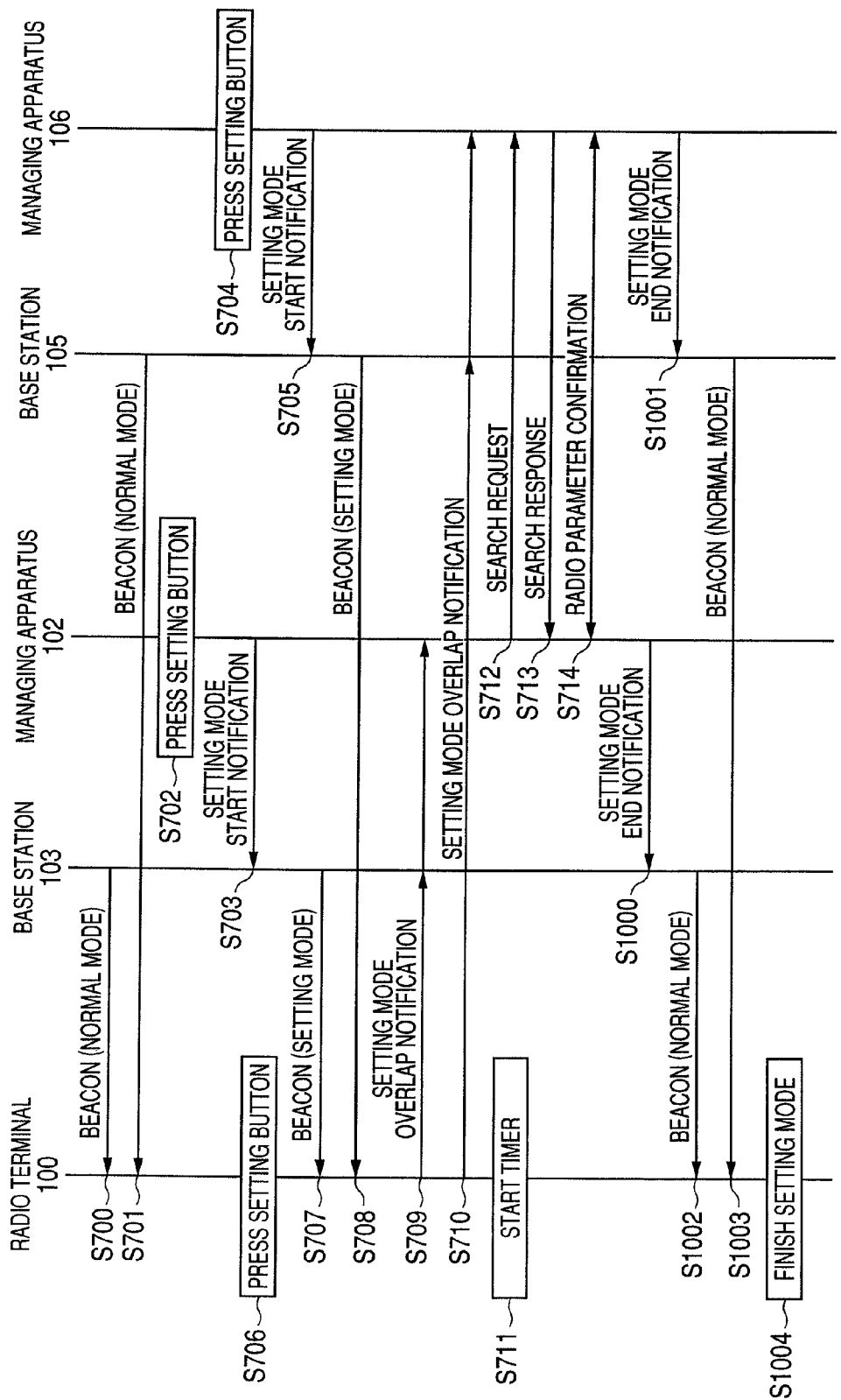
FIG. 10 is a sequence diagram in the first embodiment.

FIGS. 7 and 10 are sequence diagrams in the embodiment. FIG. 8 is a flowchart showing the operation of the radio terminal in the embodiment. The CPU 200 executes this flow according to the programs stored in the ROM 201. FIG. 9 is a flowchart showing the operation of the managing apparatus in the embodiment. The CPU 300 executes this flow according to the programs stored in the ROM 301.

The radio terminal 100 receives the beacons (normal mode) which are periodically transmitted from the base stations 103 and 105 (S700, S701). The user of the radio terminal 100 desires here to connect the radio terminal 100 to the base station 103 and make the data communication. For this purpose, the user of the radio terminal 100 wants to set the radio parameters of the base station 103 which is managed by the managing apparatus 102 into the radio terminal 100.

The user of the radio terminal 100 sets the managing apparatus 102 for managing the radio parameters of the base station 103 into the setting mode and presses the setting button 304 in the managing apparatus 102 in order to make the radio parameter automatic setting of the radio terminal 100 by using the managing apparatus 102 (S702, 900). When the depression of the setting button 304 is detected, the managing apparatus 102 changes the operating mode corresponding to its own apparatus of the managing apparatus information unit 305 to "1" to thereby shift the operating mode from the normal mode to the setting mode and notifies the base station 103 as a management target of the start of the setting mode (S703, 901). At this time, it is assumed that the setting button 304 in the managing apparatus 106 has also been pressed by another user (S704, 900). When the depression of the setting button 304 is detected, the managing apparatus 106 notifies the base station 105 of the start of the setting mode (S705, 901). When the setting mode is started, the managing apparatuses 102 and 106 monitor whether or not the overlap notification and a setting request from the radio terminal, which will be described hereinafter, have been received.

Each of the base stations 103 and 105 which have been notified of the start of the setting mode sets the mode area 400 in the reservation area of the beacon into "1" and transmits the beacon (setting mode).

The user of the radio terminal 100 presses the setting button 203 in order to also set the radio terminal 100 into the setting mode (S706, 800). When the depression of the setting button 203 is detected, the radio terminal 100 starts to scan for a predetermined time (801) in order to search for the base station 103 which is a base station connected to the managing apparatus 102 and which is operating in the setting mode. After the start of the scan, when the beacon (setting mode) transmitted from each of the base stations 103 and 105 is received (S707, S708, 802), the radio terminal 100 stores information of the base station which is known from the received beacon into the base station information unit 205 (803).

A state of the base station information unit 205 in the case where the beacons of the base stations 103 and 105 have been received as shown in the example of FIG. 7 is illustrated in FIG. 5. It will be understood from FIG. 5 that the information of the base stations 103 and 105 other than the MAC addresses 501 is the same.

When the scan is finished (YES in 804), the radio terminal 100 discriminates the number of base stations in the setting mode (805).

If there is one base station in the setting mode ("1" in 805), the radio terminal 100 is connected to this base station by using a packet which can be communicated irrespective of the radio parameters set in the base station and transmits the setting request to the managing apparatus. The base station which has received the setting request transfers the setting request to the managing apparatus which manages its own radio parameters. When the setting request is detected, the managing apparatus notifies the request-transmitted radio terminal of the radio parameters which are managed and executes a setting process between the radio terminal and the managing apparatus (811, 906). When the setting of the radio parameters is finished, the managing apparatus notifies the base station of the end of the setting mode. When the setting mode end notification is received from the managing apparatus, the base station switches the operating mode to the normal mode. The radio terminal 100 sets the radio communication parameters provided from the managing apparatus 102, is connected to the base station 103 which operates in the normal mode, and can make the data communication. In the above description, the radio terminal has communicated with the managing apparatus by using the packet which can be communicated irrespective of the radio parameters set in the base station. However, it is also possible to construct in such a manner that when the setting mode is set, the radio parameters of the base station and the radio terminal are switched to the preset radio parameters for setting, thereby enabling the communication between the radio terminal and the base station to be made and enabling the communication between the radio terminal and the managing apparatus to be made. Also in the following description, the communication upon setting of the radio parameters is made by a similar method.

If there are no base stations in the setting mode and the number of base stations in the setting mode is equal to 0 ("0" in 805), its own setting mode is finished (812).

In the example of FIG. 5, since both of base stations 103 and 105 are operating in the setting mode, the radio terminal 100 determines that there are a plurality of base stations in the setting mode ("plural" in 805). In this case, the radio terminal 100 notifies the base stations 103 and 105 which are operating in the setting mode of the overlap of the setting mode (S709, S710, 806). After all of the base stations which are operating in the setting mode were notified of the overlap (YES in 807), the radio terminal 100 starts the timer 206 (S711, 808).

When the setting mode overlap notification received by the base station 103 in S709 is transferred from the base station 103 (YES in 902), the managing apparatus 102 searches for the managing apparatus (903). Information of the searched managing apparatus is stored into the managing apparatus information unit 305. As a searching method, there is a method of requesting to search for all apparatuses connected onto the wired LAN 107, or the like.

The managing apparatus 102 receives a search response from the managing apparatus 106 (S713) in response to the search request transmitted in S712. The managing apparatuses 102 and 106 mutually confirm the radio parameters which are managed (S714, 904). The confirmed radio parameters are stored into the managing apparatus information unit 305. The managing apparatus 102 compares the radio parameters of the managing apparatus 106 stored in the managing apparatus information unit 305 with the radio parameters managed by itself, thereby confirming whether or not they are the same (905).

FIG. 6 shows a state of the managing apparatus information unit 305 at that point of time. It will be understood from FIG. 6 that the radio parameters managed by its own apparatus (that is, the managing apparatus 102) and the radio parameters managed by the managing apparatus 106 are the same (YES in 905). Even if there are a plurality of base stations which are operating in the setting mode, when the radio parameters are the same, naturally, the radio terminal 100 may receive the radio parameters from any one of the managing apparatuses. In other words, even when the base stations 103 and 105 are operating in the setting mode, in the case where the managing apparatus 102 which manages the radio parameters of the base station 103 and the managing apparatus 106 which manages the radio parameters of the base station 105 manage the same radio parameters, the same radio parameters are set into the radio terminal 100 even if it has received the radio parameters from any one of the managing apparatuses. Therefore, in such a case, the base stations 103 and 105 periodically and continuously transmit the beacons of the setting mode without finishing the setting mode (S715, S716).

When the radio parameters of the searched managing apparatus 106 are the same as the radio parameters which are managed by its own managing apparatus 102 (YES in 905), the managing apparatus 102 waits for the setting request from the radio terminal. When the setting request is detected, the managing apparatus 102 executes the setting process of the radio parameters between the managing apparatus 102 and the radio terminal (906).

The radio terminal 100 discriminates whether or not the base stations 103 and 105 finish the setting mode before the time-out of the timer 206 activated in 808. In the example of FIG. 7, since the base stations 103 and 105 periodically transmit the beacons of the setting mode (S715, S716), the radio terminal 100 does not detect the end of the setting mode of the base stations (NO in 809) and the time-out of the timer 206 occurs (S717, 810). The radio terminal 100 is connected to the base station which is operating in the setting mode, transmits the setting request to the managing apparatus, and executes the setting process of the radio parameters between the managing apparatus and the radio terminal (811, 906). In the example of FIG. 7, the radio terminal 100 is connected to the base station 103 (S718) and sets the radio communication parameters between the radio terminal and the managing apparatus 102 (S720, 811, 906). When the setting of the radio parameters is finished, the managing apparatus notifies the base station of the end of the setting mode. When the setting mode end notification is received from the managing apparatus, the base station switches the operating mode to the normal mode. The radio terminal 100 sets the radio communication parameters provided from the managing apparatus 102, is connected to the base station 103 which is operating in the normal mode, and can make the data communication.

A sequence in the case where the radio parameters which are managed by the managing apparatuses 102 and 106 differ is illustrated in FIG. 10.

If it is determined that the radio parameters are not the same (NO in 905), the managing apparatuses 102 and 106 notify the base stations 103 and 105 of the end of the setting mode (S1000, S1001, 908). Each of the managing apparatuses 102 and 106 finishes its own setting mode (909). When the setting mode end notification is received (S1000, S1001), the base stations 103 and 105 periodically transmit the beacon of the normal mode in which the mode area 400 of the beacon has been set into "0" (S1002, S1003).

The radio terminal 100 receives the beacon of the normal mode before the time-out of the timer 206 (S1002, S1003), detects that the base stations 103 and 105 have finished the setting mode (YES in 809), and finishes the setting mode (S1004, 812).

As mentioned above, in the embodiment, when a plurality of base stations which are operating in the setting mode is detected, the radio terminal notifies those base stations of the overlap and notifies the managing apparatus of the overlap of the setting mode through the base stations. Therefore, the managing apparatus and the base stations can finish the setting mode in a short time.

If there are a plurality of managing apparatuses in the setting mode, each of the managing apparatuses confirms the coincidence or dissidence of the radio parameters which are managed by itself. Thus, when the radio parameters which are managed by the managing apparatuses in the setting mode coincide and the same radio parameters are set into the radio terminal even if the radio parameters are set from any one of the managing apparatuses, the setting mode is continued, thereby enabling the radio parameters to be set.

In the embodiment, when the end of the setting mode of the base station is detected for a time interval from the start to the end of the timer 206, the radio terminal 100 finishes the setting mode. However, the managing apparatus may transmit the notification showing the coincidence or dissidence of the radio parameters to the radio terminal through the base station. In this case, if the radio terminal receives the dissidence notification, the setting mode is finished, and if it receives the coincidence notification, the setting mode is continued.

Second Embodiment

In this embodiment, the radio parameters which are managed by the managing apparatus are preliminarily grouped and the base station notifies the radio terminal of identification information of the group of the radio parameters which are managed by the managing apparatus. The radio terminal analogizes the coincidence or dissidence of the parameters from the identification information of the group.

The embodiment will now be described hereinbelow with reference to the drawings. The portions which have already been described are designated by the same reference numerals and their description is omitted. The constructions of the radio terminals 100 and 104 and the managing apparatuses 102 and 106 are similar to those in the first embodiment.

FIG. 11 shows a reservation area of a beacon which is transmitted from the base station in the embodiment. In the embodiment, a part of the reservation area is used to show the group to which the base stations belong. In the embodiment, it is assumed that the same radio parameters have been set in the base stations of the same group.

FIG. 12 shows a construction of the base station information unit 205 of the radio terminal in the embodiment. Identification information 1200 of the group to which each base station belongs has been stored in the base station information unit 205.

Figure 13:
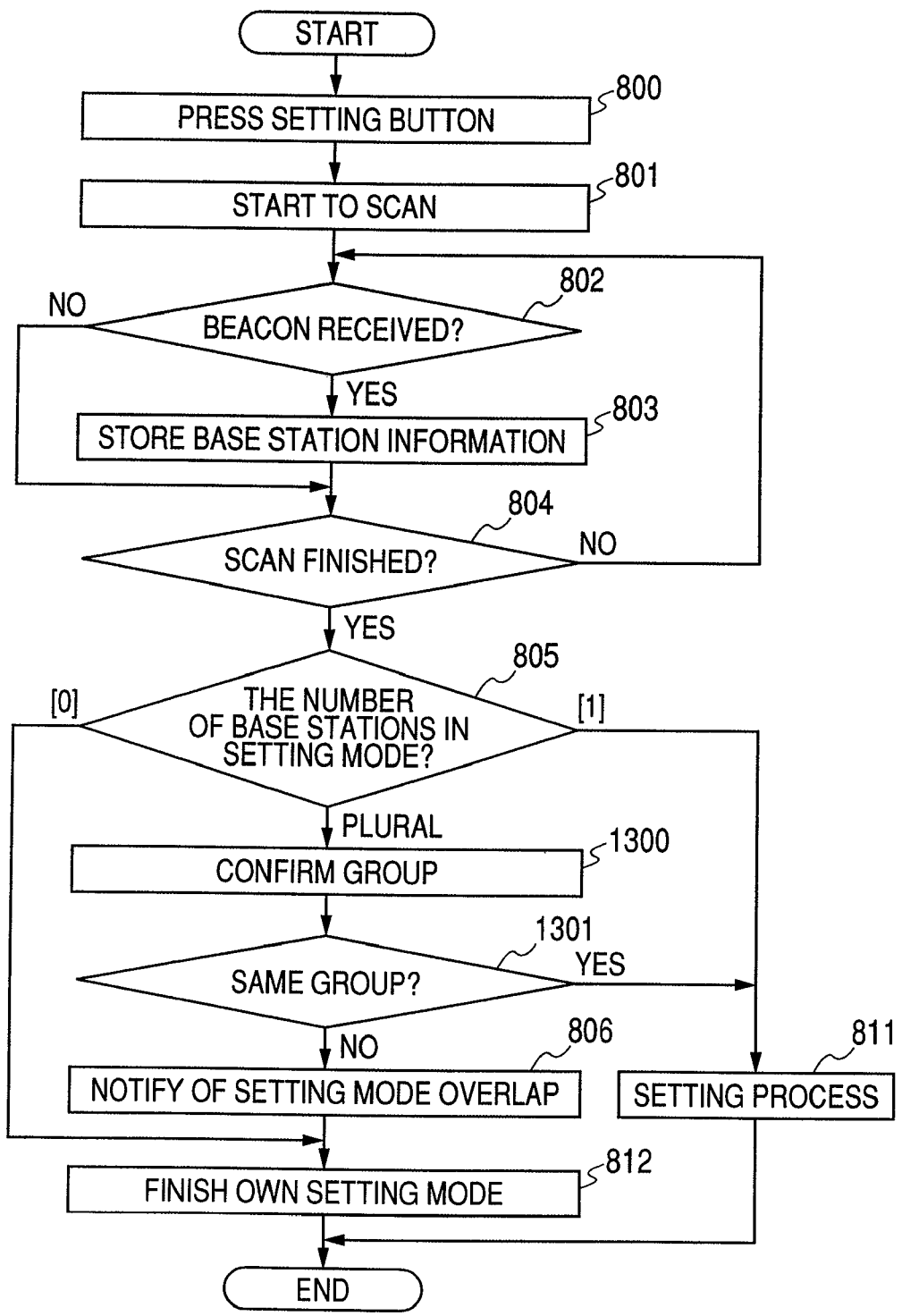
FIG. 13 is a flowchart of a radio terminal in the second embodiment.
Figure 14:
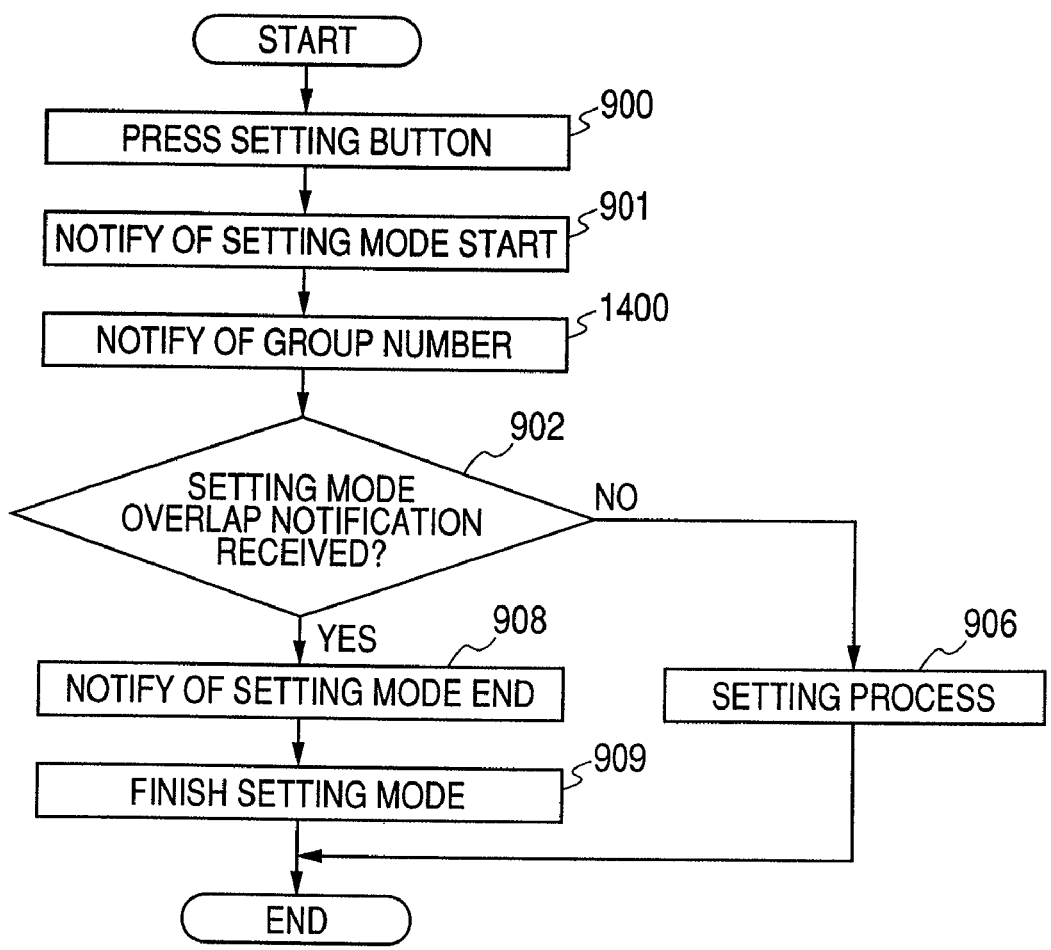
FIG. 14 is a flowchart of a managing apparatus in the second embodiment.

FIG. 13 is a flowchart showing the operation of the radio terminal in the embodiment. This processing flow is executed by the CPU 200 according to the programs stored in the ROM 201. FIG. 14 is a flowchart showing the operation of the managing apparatus in the embodiment. This processing flow is executed by the CPU 300 according to the programs stored in the ROM 301.

Also in the embodiment, the user of the radio terminal 100 wants to connect the radio terminal 100 to the base station 103 and make the data communication. Therefore, the user of the radio terminal 100 wants to set the radio parameters of the base station 103 which are managed by the managing apparatus 102 into the radio terminal 100.

The user of the radio terminal 100 sets the managing apparatus 102 which manages the radio parameters of the base station 103 into the setting mode and depresses the setting button 304 of the managing apparatus 102 in order to make the radio parameter automatic setting of the radio terminal 100 by using the managing apparatus 102 (900).

When the depression of the setting button 304 is detected, the managing apparatus 102 changes the operating mode corresponding to its own apparatus in the managing apparatus information unit 305 to "1", shifts the operating mode from the normal mode to the setting mode, and notifies the base station 103 as a management target of the start of the setting mode (901). The managing apparatus 102 notifies the base station 103 of the group number of the radio parameters which are managed (1400). It is now assumed that the managing apparatus 102 notifies the base station 103 of the group number "1". The base station 103 starts to periodically transmit the beacon indicative of the setting mode and the group number "1". At this time, it is assumed that the setting button 304 of the managing apparatus 106 has also been depressed by another user. When the depression of the setting button 304 is detected (900), the managing apparatus 106 notifies the base station 105 of the start of the setting mode (901). The managing apparatus 106 notifies the base station 105 of the group number of the radio parameters which are managed (1400). It is now assumed that the managing apparatus 106 also notifies the base station 105 of the group number "1". The base station 105 starts to periodically transmit the beacon indicative of the setting mode and the group number "1". When the setting mode is started, each of the managing apparatuses 102 and 106 monitors whether or not the overlap notification and the setting request from the radio terminal have been received.

The user of the radio terminal 100 presses the setting button 203 in order to also set the radio terminal 100 into the setting mode (800). When the depression of the setting button 203 is detected, the radio terminal 100 starts to scan for the predetermined time in order to search for the base station 103 which is a base station connected to the managing apparatus 102 and which is operating in the setting mode (801). After the start of the scan, when the beacons (setting mode) transmitted from the base stations 103 and 105 are received (802), the radio terminal 100 stores the information of the base stations 103 and 105 which is known from the received beacons into the base station information unit 205 (803). A state of the base station information unit 205 in the case where the beacons of the base stations 103 and 105 were received is illustrated in FIG. 12. It will be understood from FIG. 12 that the two base stations of the setting group exist and the base stations 103 and 105 have transmitted the beacons of the same group number.

When the scan is finished (YES in 804), the radio terminal 100 discriminates the number of base stations in the setting mode (805). When referring to the base station information unit 205 in FIG. 12, the number of base stations in the setting mode is equal to 2 ("plural" in 805), the radio terminal 100 confirms the group of the base stations stored in the base station information unit 205 (1300).

If the number of base stations in the setting mode is equal to "1" or "0", processes similar to those in FIG. 8 are executed.

In the example of FIG. 12, since the groups (1200) of the base stations 103 and 105 are equal to "1", the radio terminal 100 determines that those groups are the same (YES in 1301). If all of the group numbers shown by the beacons which are transmitted from the base stations in the setting mode coincide, the radio parameters which are managed by the managing apparatuses which manage the radio parameters of those base stations are the same. Therefore, even if the radio parameters are received from any one of the managing apparatuses, the same radio parameters are set. In such a case, the radio terminal 100 continues the setting mode, is connected to the base station in the setting mode, and executes the setting process of the radio parameters between the radio terminal 100 and the managing apparatus (811). When the setting of the radio parameters is finished, the managing apparatus notifies the base station of the end of the setting mode. When the setting mode end notification is received from the managing apparatus, the base station switches the operating mode to the normal mode. The radio terminal 100 sets the radio communication parameters provided from the managing apparatus 102, is connected to the base station 103 which is operating in the normal mode, and can make the data communication.

If the group 1200 in the base station information unit 205 stored in 803 differs, the radio terminal 100 notifies all of the base stations stored in the index number 500 of the base station that the setting mode has been overlapped (806) and finishes the setting mode (812). In this instance, the base stations 103 and 105 are notified of the overlap.

When the overlap notification is transferred from the base stations 103 and 105 (YES in 902), the managing apparatuses 102 and 106 notify the base stations 103 and 105 of the end of the setting mode (908) and finish the setting mode (909).

As mentioned above, in the embodiment, when the dissidence of the group numbers included in the beacons is detected, the radio terminal transmits the overlap notification. When the overlap notification is received, the managing apparatuses finish the setting mode. Thus, the processes such as search request (S712), search response (S713), and radio communication parameter confirmation (S714) in FIG. 10 (sequence of the first embodiment) can be omitted. The setting modes of the managing apparatus and the base station can be finished in a shorter time. In a manner similar to the first embodiment, even when there are a plurality of managing apparatuses in the setting mode, if the radio parameters which are managed by the managing apparatuses coincide, the setting mode is continued, thereby enabling the radio parameters to be set.

Third Embodiment

In this embodiment, before the radio terminal finishes its own setting mode in FIGS. 8 and 13, the radio terminal displays a message for urging the user to depress again the setting button 304 of the managing apparatus onto the display unit 207 for a predetermined time.

Figure 15:
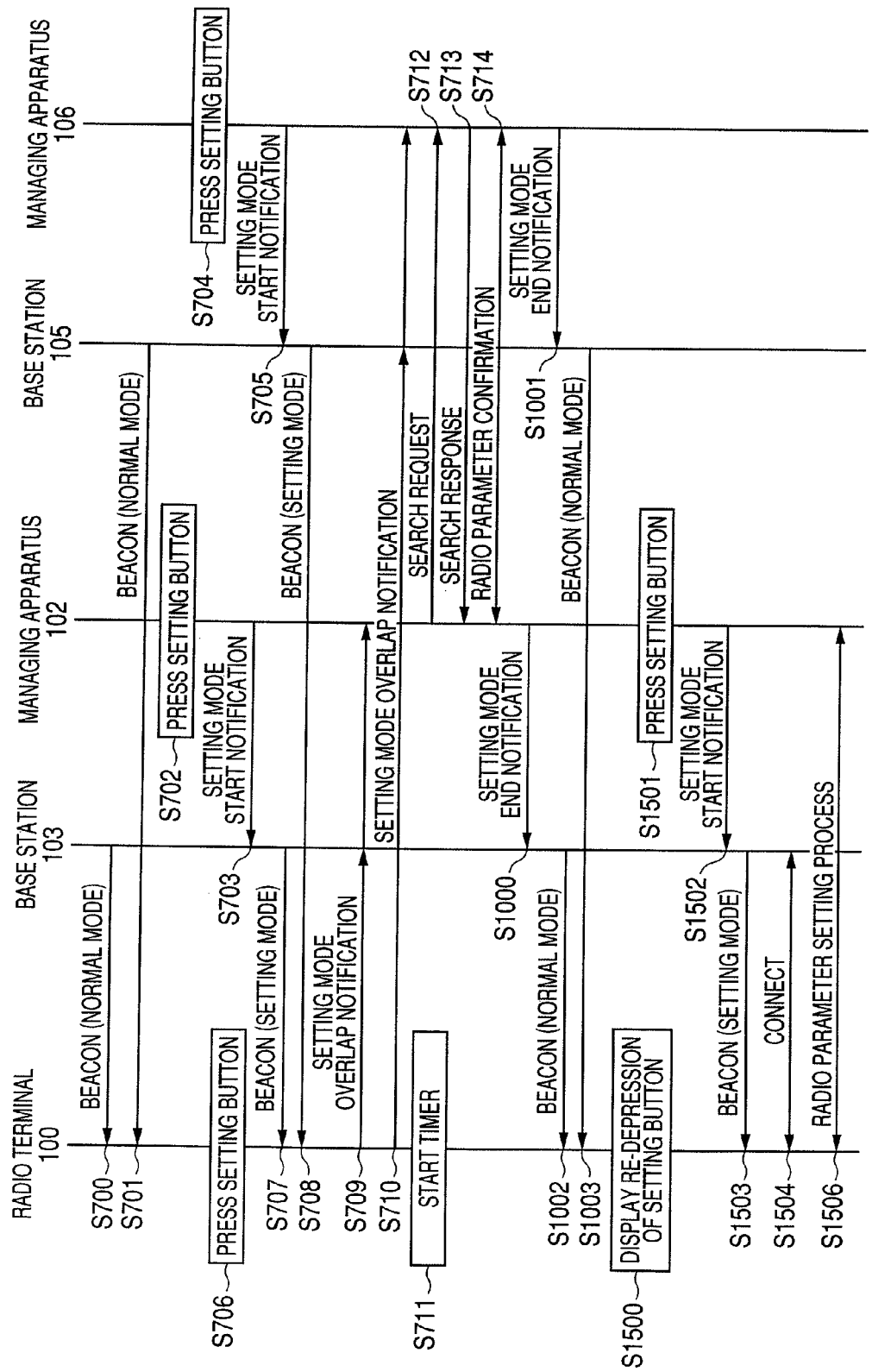
FIG. 15 is a sequence diagram in the third embodiment.
Figure 16:
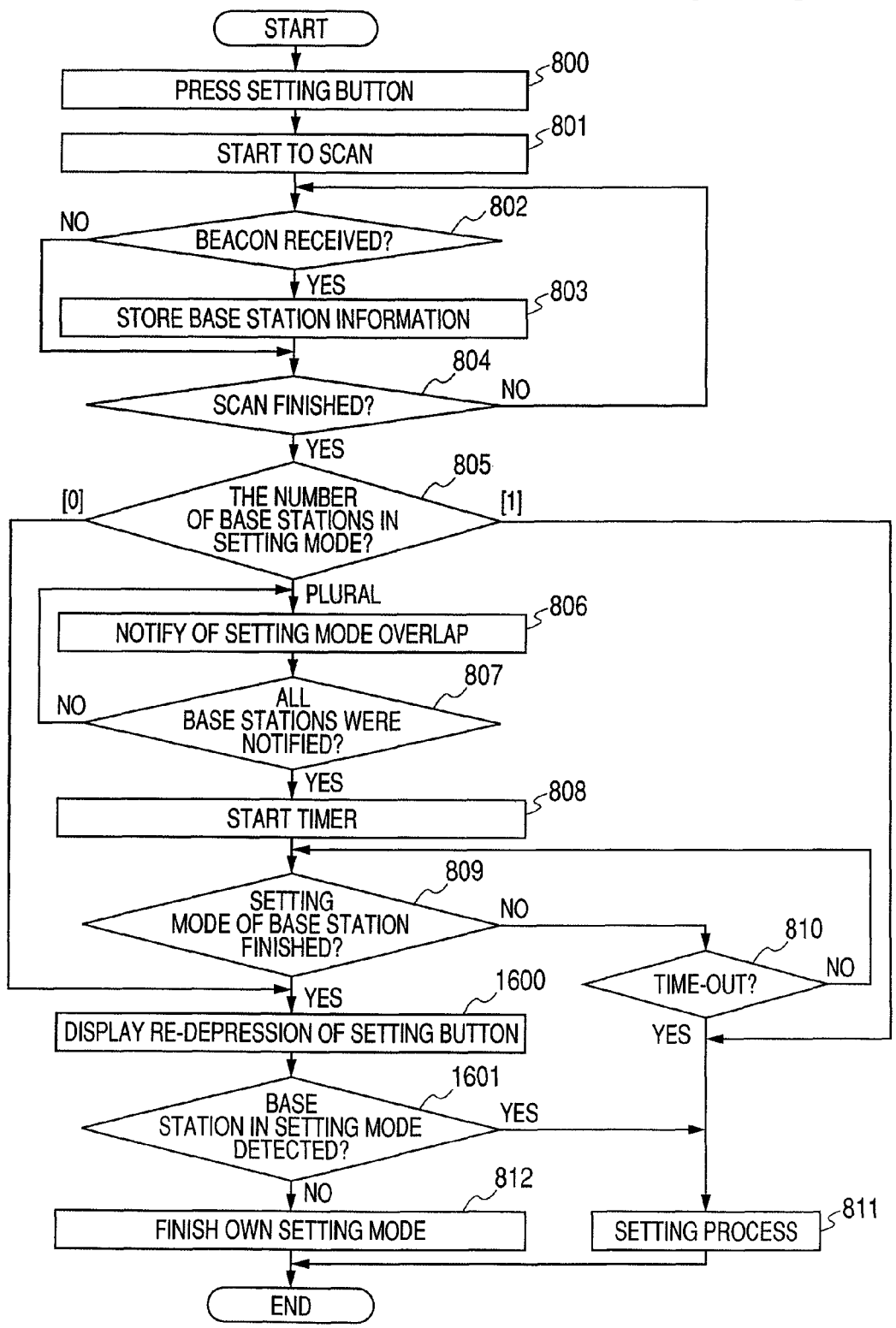
FIG. 16 is a flowchart of a radio terminal in the third embodiment.

FIG. 15 is a sequence diagram in the embodiment. FIG. 16 is a flowchart showing the operation of the radio terminal in the embodiment. This processing flow is executed by the CPU 200 according to the programs stored in the ROM 201. The portions which have already been described are designated by the same reference numerals and their description is omitted. The constructions of the radio terminals 100 and 104 and the managing apparatuses 102 and 106 are similar to those in the first embodiment.

When it is detected that the base stations 103 and 105 have finished the setting mode in S1002 and S1003 (YES in 809), the radio terminal 100 displays the message for urging the user to depress again the setting button 304 of the managing apparatus onto the display unit 207 for the predetermined time (S1500, 1600). Also in the case where none of the base stations in the setting mode could be detected in step 805, the radio terminal 100 displays the message for urging the user to depress again the setting button 304 of the managing apparatus onto the display unit 207 for the predetermined time (1600).

It is assumed that the user of the radio terminal 100 has depressed again the setting button 304 of the managing apparatus 102 according to the displayed message (S1501). If the setting button 304 is pressed again after the setting mode was finished (909 in FIG. 9), the managing apparatus 102 returns to step 900 and notifies the base station 103 of the start of the setting mode (901, S1502).

The base station 103 transmits the beacon showing that its own station is in the setting mode (S1503). At this time, if the setting button 304 in the managing apparatus 106 is not pressed, the base station 105 transmits the beacon showing the normal mode.

The radio terminal 100 receives the beacon in S1503 and detects the base station 103 in the setting mode (1601). The radio terminal 100 is connected to the base station in the setting mode which has been detected first after the message showing the re-depression of the setting button was displayed and executes the setting of the radio communication parameters between the radio terminal 100 and the managing apparatus (811). In the example of FIG. 15, since the beacon (setting mode) from the base station 103 is detected (S1601), the radio terminal 100 is connected to the base station 103 and executes the setting of the radio communication parameters between the radio terminal 100 and the managing apparatus 102 (S1506, 811). When the setting of the radio parameters is finished, the managing apparatus notifies the base station of the end of the setting mode. When the setting mode end notification is received from the managing apparatus, the base station switches the operating mode to the normal mode. The radio terminal 100 sets the radio communication parameters provided from the managing apparatus 102, is connected to the base station 103 which is operating in the normal mode, and can make the data communication. If the base station in the setting mode cannot be detected even after the elapse of the predetermined time after the message showing the re-depression of the setting button had been displayed, the radio terminal 100 finishes its own setting mode (812).

In the above description, when the end of the setting mode of the base station is detected in FIG. 16, the message for urging the re-depression of the setting button 304 of the managing apparatus is displayed onto the display unit 207. However, the message can be also displayed after the overlap notification to the base station (806) shown in FIG. 13. Also in this case, the radio terminal 100 is connected to the base station in the setting mode which has been detected first after the display of the message showing the re-depression of the setting button and executes the setting of the radio communication parameters between the radio terminal 100 and the managing apparatus.

As mentioned above, in the embodiment, when it is detected that the base station has finished the setting mode, the radio terminal displays the message for urging the user to depress again the setting button of the managing apparatus onto the display unit. The radio terminal executes the setting of the radio parameters between the radio terminal and the managing apparatus through the base station in the setting mode which has been detected first. Thus, in addition to the effects of the first and second embodiments, the radio parameters can be easily received from a desired managing apparatus.

Fourth Embodiment

Also in this embodiment, before the radio terminal finishes its own setting mode in FIGS. 8 and 13, the radio terminal displays the message for urging the user to depress again the setting button 304 of the managing apparatus onto the display unit 207 for the predetermined time. When the setting button 304 of the managing apparatus is pressed again, the managing apparatus requests the base station to change the contents of the beacon, thereby changing contents of the beacon.

Figure 17:
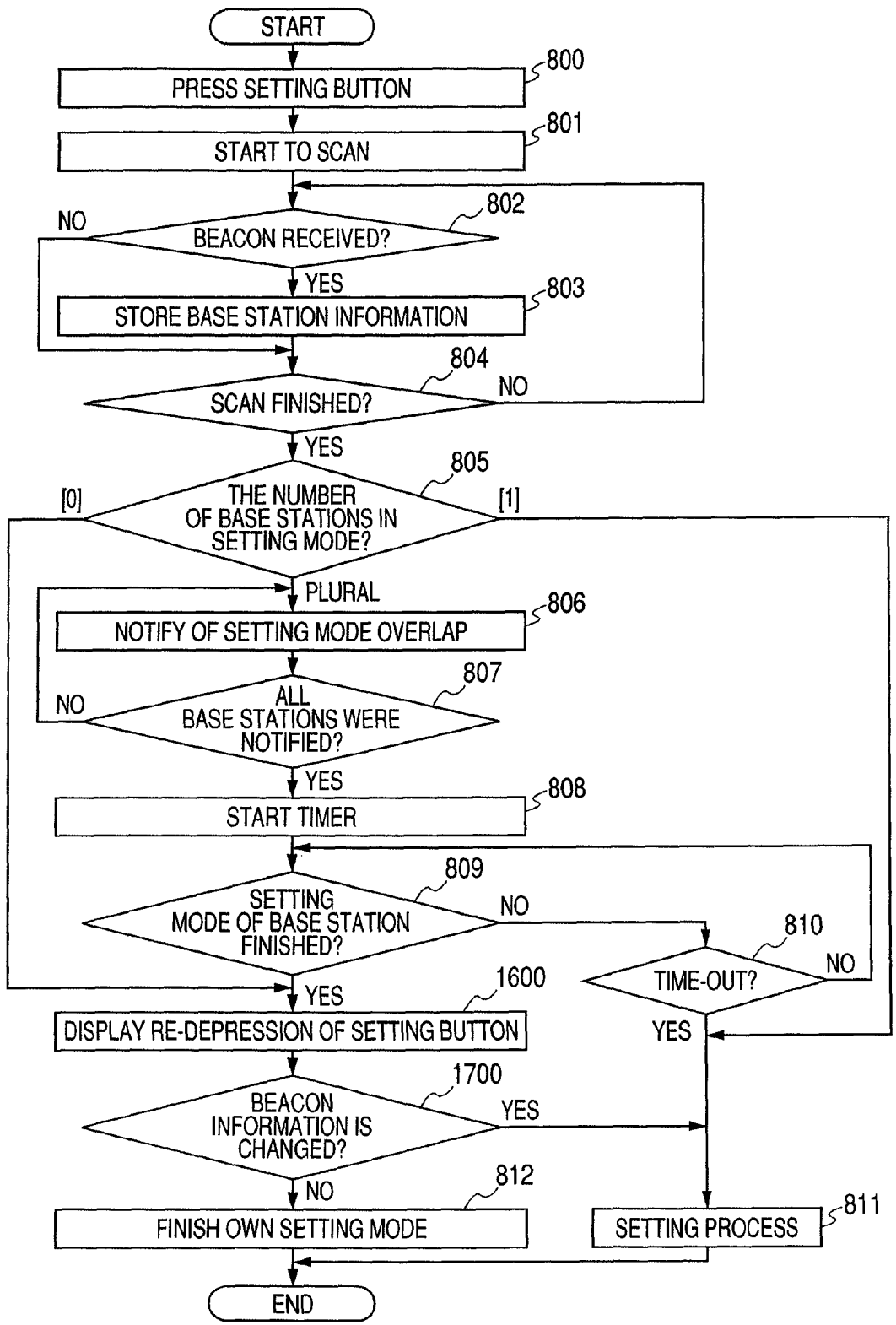
FIG. 17 is a flowchart of a radio terminal in the fourth embodiment.
Figure 18:
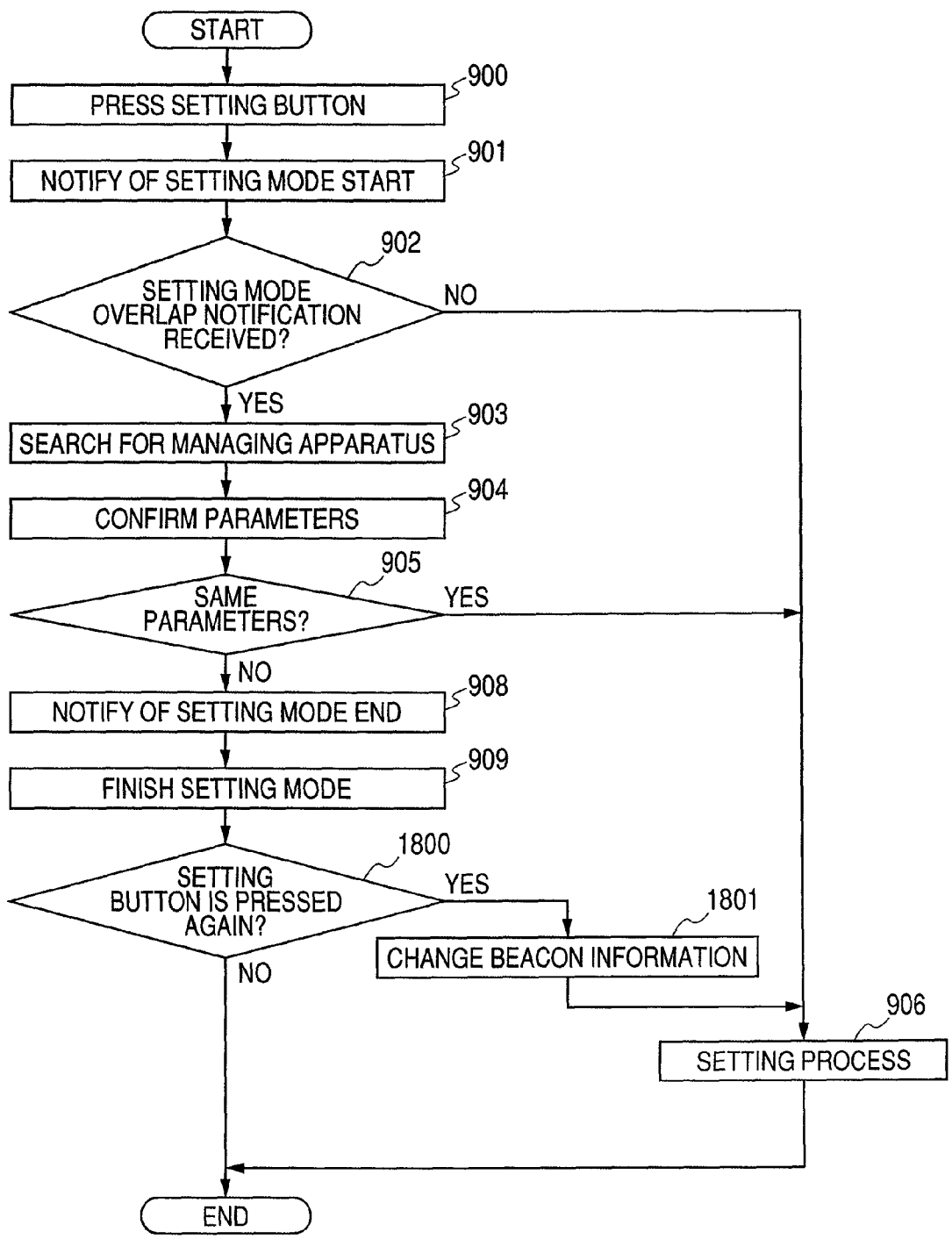
FIG. 18 is a flowchart of a managing apparatus in the fourth embodiment.

FIG. 17 is a flowchart showing the operation of the radio terminal in the embodiment. This processing flow is executed by the CPU 200 according to the programs stored in the ROM 201. FIG. 18 is a flowchart showing the operation of the managing apparatus in the embodiment. This processing flow is executed by the CPU 300 according to the programs stored in the ROM 301. The portions which have already been described are designated by the same reference numerals and their description is omitted.

When it is detected that the base stations 103 and 105 have finished the setting mode in S1002 and S1003 (YES in 809), the radio terminal 100 displays the message for urging the user to depress again the setting button 304 of the managing apparatus onto the display unit 207 for the predetermined time (S1500, 1600). Also in the case where none of the base stations in the setting mode could be detected in step 805, the radio terminal 100 displays the message for urging the user to depress again the setting button 304 of the managing apparatus onto the display unit 207 for the predetermined time (1600).

It is assumed that the user of the radio terminal 100 has depressed again the setting button 304 of the managing apparatus 102 according to the displayed message.

If the setting button 304 is pressed again after completion of the setting mode (909 in FIG. 9), the managing apparatus 102 requests the base station to change the contents of the beacon (1801), thereby allowing the base station to change the information of the reservation area of the beacon. When the request for the change of the contents of the beacon is received from the managing apparatus, the base station transmits the beacon whose contents have been changed. As a method of changing the information of the reservation area of the beacon, there is a method whereby, for example, random values have previously been stored in a specific area in the reservation area and they are changed or the like.

When the change in the beacon is detected (YES in 1700), the radio terminal 100 is connected to the base station which detected the change in the beacon first and executes the setting of the radio parameters between the radio terminal 100 and the managing apparatus (811, 906). When the setting of the radio parameters is finished, the managing apparatus notifies the base station of the end of the setting mode. When the setting mode end notification is received from the managing apparatus, the base station switches the operating mode to the normal mode. The radio terminal 100 sets the radio communication parameters provided from the managing apparatus 102, is connected to the base station 103 which is operating in the normal mode, and can make the data communication. If the base station in the setting mode cannot be detected even after the elapse of the predetermined time after the message showing the re-depression of the setting button had been displayed, the radio terminal 100 finishes its own setting mode (812).

In the above description, when the end of the setting mode of the base station is detected in FIG. 17, the message for urging the re-depression of the setting button 304 of the managing apparatus is displayed onto the display unit 207. However, the message can be also displayed after the overlap notification to the base station (806) shown in FIG. 13. Also in this case, the radio terminal 100 is connected to the base station in which the beacon change has been detected first after the display of the message showing the re-depression of the setting button and executes the setting of the radio communication parameters between the radio terminal 100 and the managing apparatus.

As mentioned above, when the setting button is pressed again, the managing apparatus allows the base station tot change the contents of the beacon which is transmitted from the base station. The radio terminal is connected to the base station in which the beacon has been changed first and executes the setting of the radio parameters between the radio terminal 100 and the managing apparatus. Thus, in addition to the effects of the first and second embodiments, the radio parameters can be easily received from a desired managing apparatus.

Fifth Embodiment

In this embodiment, when a plurality of managing apparatuses in the setting mode exists, S/N ratios (Signal/Noise ratios) of the beacons which are transmitted from the base stations are compared and the base station to be connected is selected. This construction is effective in the case where a distance between the base station and the managing apparatus is small, for example, in the case where the base station and the managing apparatus exist in the same casing. That is, this is because if the distance between the base station and the managing apparatus is small, when the user holds the radio terminal and presses the setting button 304 of the managing apparatus, a distance between the radio terminal and managing apparatus is also small.

Although the constructions of the managing apparatuses 102 and 106 are similar to those in the first embodiment, the managing apparatus 102 is arranged at the position close to the base station 103 or the managing apparatus 102 and the base station 103 are arranged in the same casing. The managing apparatus 106 is arranged at the position close to the base station 105 or the managing apparatus 106 and the base station 105 are arranged in the same casing. Although the constructions of the RAMs of the radio terminals 100 and 104 differ, other constructions of the radio terminals are similar to those in the first embodiment.

Figures 19, 20, 21:
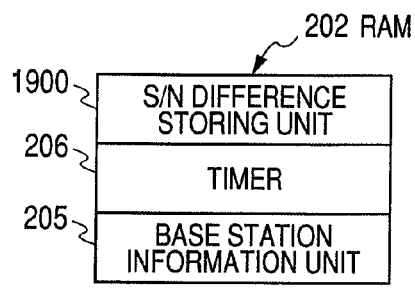
FIG. 19 shows a construction of a RAM (202) in the fifth embodiment.
FIG. 20 shows an S/N difference storing unit in the fifth embodiment.
FIG. 21 shows a base station information unit in the fifth embodiment.

FIG. 19 shows the construction of the RAM 202 in the radio terminal in the embodiment. An S/N difference storing unit 1900 exists in the RAM 202.

FIG. 20 shows the construction of the S/N difference storing unit 1900. The S/N difference storing unit 1900 is used when the radio terminal 100 compares the S/N ratios of the beacons which are transmitted from the two base stations and discriminates whether or not the connection destination can be determined. In a column 2000 of the S/N ratio, a larger value of the S/N ratio to be compared corresponds and is divided every predetermined range. In a column 2001 of the minimum value of the differences, the minimum value of the differences between the larger value of the S/N ratio and a smaller value of the S/N ratio is shown.

For example, assuming that the S/N ratio of the beacon of the base station 103 which is received by the radio terminal 100 is equal to 0×19 and the S/N ratio of the beacon of the base station 105 is equal to 0×16, its difference is equal to 0×03. Referring to FIG. 20, if the larger value of the S/N ratio is equal to 0×20–0×17 (the S/N ratio of the beacon of the base station 103 corresponds to this range), the minimum value of the differences by which the connection destination can be determined is equal to 0×05. The difference between the S/N ratios of the base stations 103 and 105 is equal to 0×03 and this value does not satisfy such a condition. Therefore, it is determined that the connection destination cannot be determined. The reason why the minimum value of the differences differs every S/N ratio column 2000 is that it depends on propagating characteristics of a radio wave.

FIG. 21 shows the base station information unit 205 of the radio terminal 100 in the embodiment. In the embodiment, an item 2100 of the S/N ratio of the signal transmitted by the base station is added to the base station information unit shown in FIG. 5.

Figure 22:
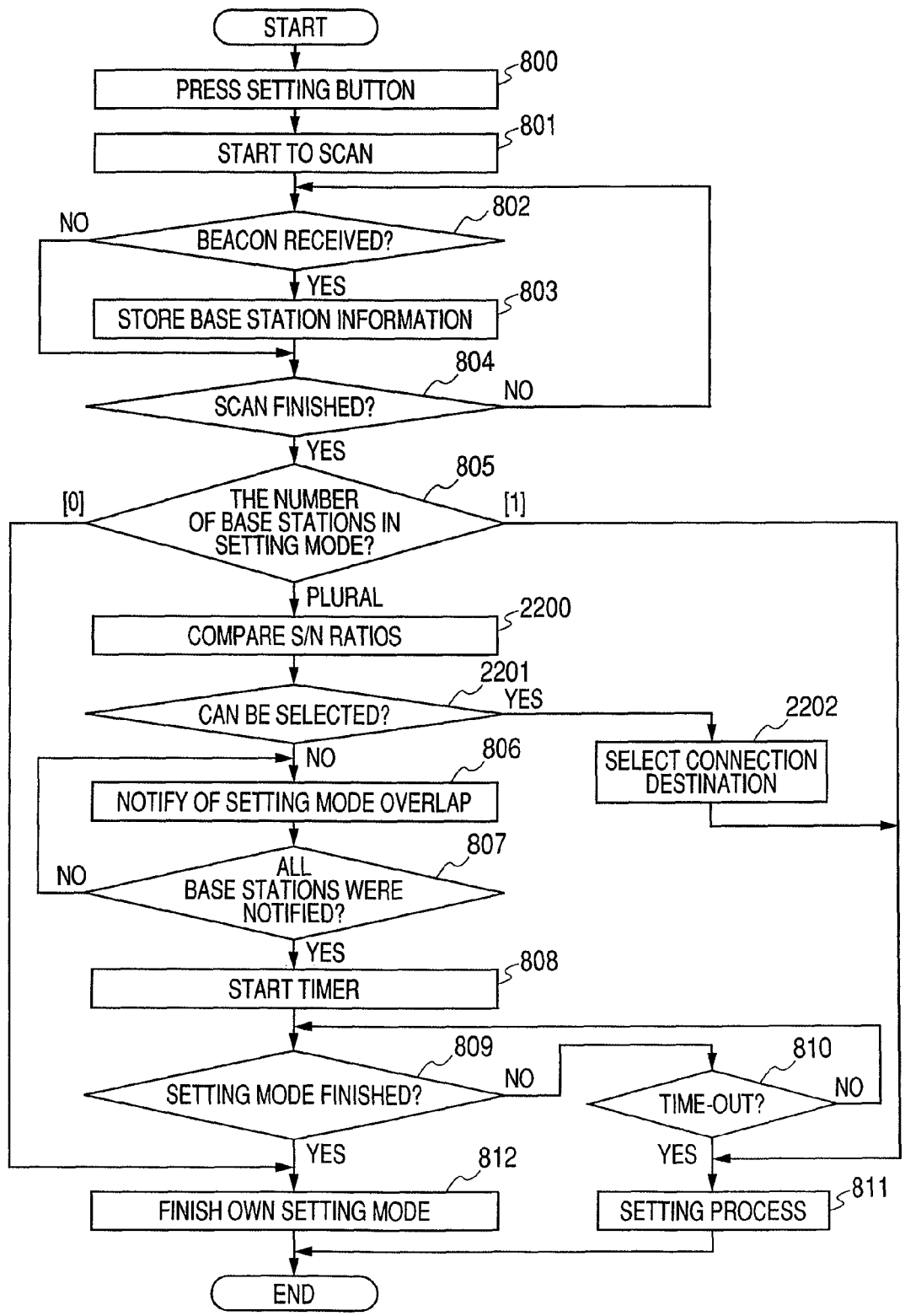
FIG. 22 is a flowchart of a radio terminal in the fifth embodiment.

FIG. 22 is a flowchart showing the operation of the radio terminal in the embodiment. This processing flow is executed by the CPU 200 according to the programs stored in the ROM 201. The operation of the radio terminal 100 will be described hereinbelow with reference to FIGS. 19 to 22. Since the operation of the managing apparatus is similar to that in the first embodiment, its description is omitted here.

Also in this embodiment, the user of the radio terminal 100 wants to connect the radio terminal 100 to the base station 103 and make the data communication. Therefore, the user of the radio terminal 100 wants to set the radio parameters of the base station 103 which are managed by the managing apparatus 102 into the radio terminal 100.

In FIG. 22, when the depression of the setting button 203 is detected (800), in order to search for the base station 103, the radio terminal 100 starts to scan for the predetermined time (801). After the start of the scan, when the beacon (setting mode) transmitted from each of the base stations 103 and 105 is received (802), the radio terminal 100 stores the information of the base station which is known from the received beacon into the base station information unit 205 (803).

When the scan is finished (YES in 804), the radio terminal 100 discriminates the number of base stations in the setting mode (805).

If there is one base station in the setting mode ("1" in 805), the radio terminal 100 is connected to the relevant base station and executes the setting process of the radio parameters between the radio terminal 100 and the managing apparatus (811). If there are no base stations in the setting mode ("0" in 805), the radio terminal 100 finishes its own setting mode (812).

If it is determined that there are a plurality of base stations in the setting mode ("plural" in 805), the radio terminal 100 compares the S/N ratios of the beacons transmitted from the base stations (2200). In the example of FIG. 21, the radio terminal 100 compares the S/N ratios of the beacons transmitted from the base stations 103 and 105 (2200). Referring to FIG. 21, an S/N ratio of the radio wave from the base station 103 which is received by the radio terminal 100 is equal to 0×16, an S/N ratio of the radio wave from the base station 105 which is received is equal to 0×0f, and its difference is equal to 0×07.

In FIG. 20, when the S/N ratio is equal to 0×16, the minimum value of the differences by which the connection destination can be determined is equal to 0×04. Therefore, the radio terminal 100 determines that the connection destination can be selected (YES in 2201) and decides that the base station 103 of the larger S/N ratio is the connection destination (2202). The radio terminal 100 is connected to the base station 103 and executes the setting process of the radio parameters between the radio terminal 100 and the managing apparatus 102 (811). When the setting of the radio parameters is finished, the managing apparatus notifies the base station of the end of the setting mode. When the setting mode end notification is received from the managing apparatus, the base station switches the operating mode to the normal mode. The radio terminal 100 sets the radio communication parameters provided from the managing apparatus 102, is connected to the base station 103 which is operating in the normal mode, and can make the data communication.

In step 2201, if the difference between the S/N ratios of the beacons from the base stations 103 and 105 is smaller than the minimum value 2001 of the difference in FIG. 20, the radio terminal 100 decides that the connection destination cannot be selected (NO in 2201). The radio terminal 100 transmits the overlap notification to the base stations 103 and 105 (806). The subsequent processes are similar to those in the first embodiment. The processes in the third and fourth embodiments may be executed.

In the above description, when a plurality of base stations in the setting mode is detected, the S/N ratios are compared. However, in FIG. 13, when a plurality of base stations in the setting mode is detected ("plural" in 805), the S/N ratios are compared and the base station can be also selected.

Although the embodiment has been described on the assumption that the S/N ratio is used as a value showing a nature of the radio wave, even in the case of using a field intensity (RSSI) or another information, a similar effect is obtained so long as it indicates the nature of the radio wave.

As mentioned above, according to the embodiment, when a plurality of candidates of the connection destination exists, the radio terminal decides the connection destination by using the state of the received radio wave. Further, whether or not the connection destination can be determined is discriminated by the difference between the states of the radio wave. Therefore, such a risk that the radio terminal is connected to the undesirable connection destination can be reduced.

The embodiment is effective particularly in the following cases.
1. The base station and the managing apparatus are closely arranged or exist in the same casing.
2. In the state where the user carries the radio terminal, he presses the setting button of the managing apparatus and the setting button of the radio terminal.

In the state as mentioned above, since it is presumed that the S/N ratio of the signal of the base station to be connected is large and the S/N ratio of another base station is relatively small, a possibility that the user can set the ratio parameters for connecting to the desired base station rises.

Sixth Embodiment

According to this embodiment, when the connection destination is decided by using the S/N ratios in the fifth embodiment, the user is made to confirm the connection destination by using flickering patterns of LEDs of the ratio terminal and the managing apparatus.

According to the ratio terminal and the managing apparatus in this embodiment, the LEDs as display units are added to the constructions illustrated in FIGS. 2 and 3.

Figure 23:
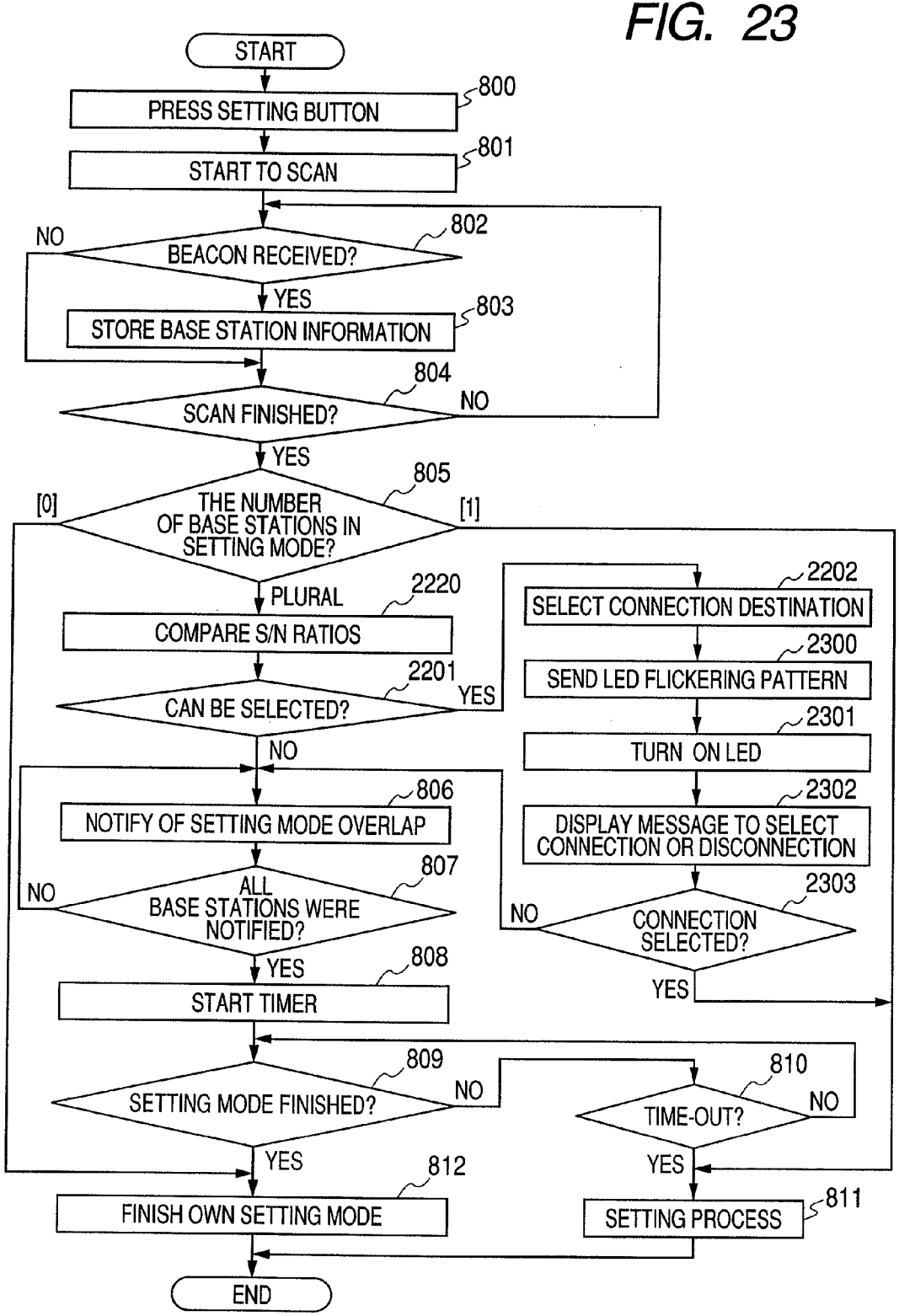
FIG. 23 is a flowchart of a radio terminal in the sixth embodiment.
Figure 24:
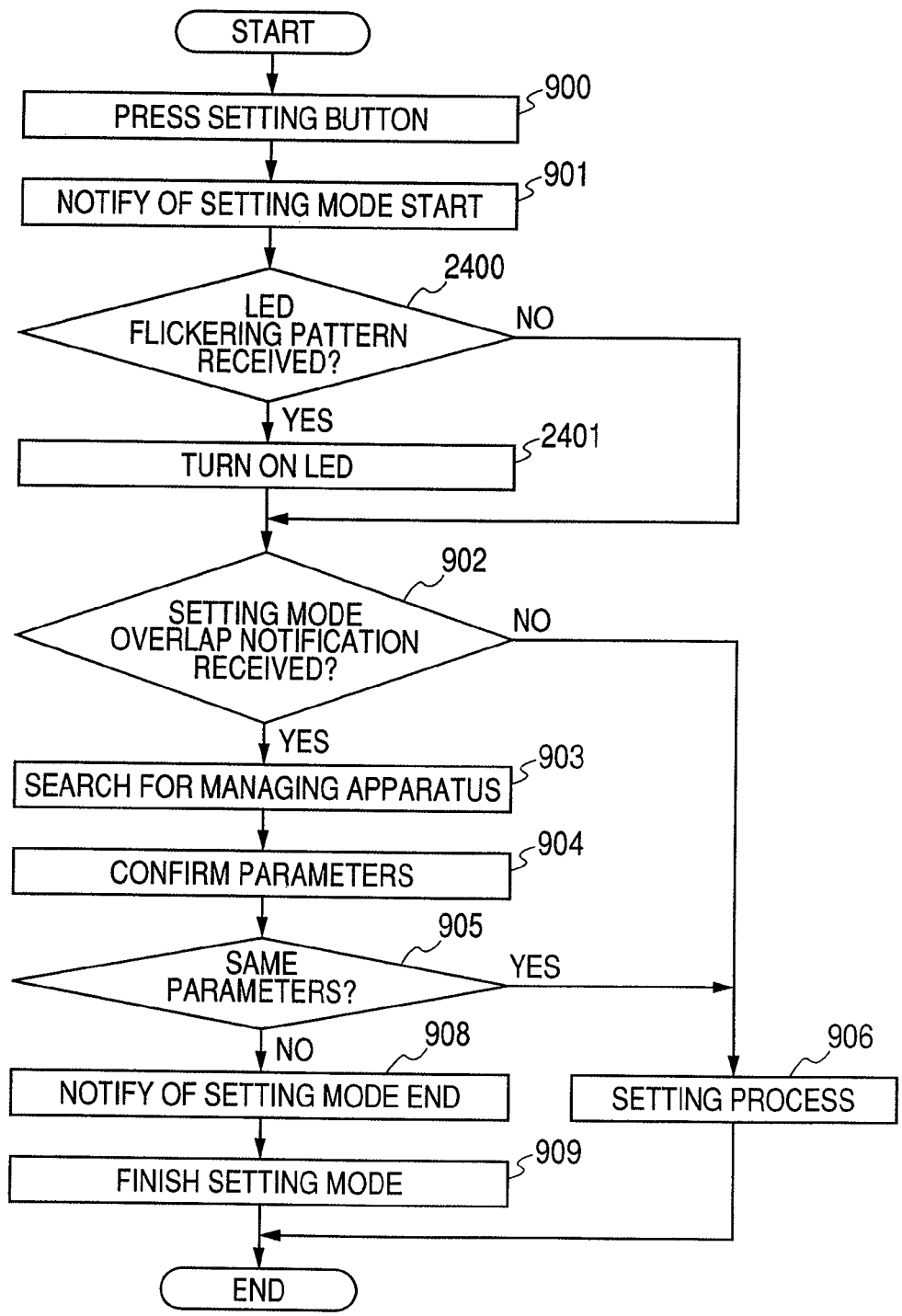
FIG. 24 is a flowchart of a managing apparatus in the sixth embodiment.

FIG. 23 is a flowchart showing the operation of the radio terminal in the embodiment. This processing flow is executed by the CPU 200 according to the programs stored in the ROM 201. FIG. 24 is a flowchart showing the operation of the managing apparatus in the embodiment. This processing flow is executed by the CPU 300 according to the programs stored in the ROM 301. The portions which have already been described are designated by the same reference numerals and their description is omitted.

When the connection destination is selected by using the S/N ratios in 2202 as described above in FIG. 22, the radio terminal 100 transmits the flickering pattern of the LED to the base station as a relevant connection destination (2300). The radio terminal 100 turns on and off (flicker) its own LED according to the same flickering pattern as the flickering pattern transmitted to the base station (2301).

The base station which has received the flickering pattern of the LED transfers the flickering pattern of the LED to the managing apparatus which manages its own radio parameters. When the flickering pattern of the LED is received, the base station 103 transfers the received flickering pattern to the managing apparatus 102.

When the flickering pattern of the LED is received from the base station 103 (2400), the managing apparatus 102 turns on and off (flickers) its own LED according to the received flickering pattern (2401).

After the LED was flickered in 2301, the radio terminal 100 displays a message for allowing the user to confirm the flickering pattern of the LED of the desired connection destination (in this case, managing apparatus 102) onto the display unit 207. The radio terminal 100 displays a message for allowing the user to select the connection or disconnection (2302).

When "connection" is selected (YES in 2303) by the user who has confirmed the message displayed in 2302, the radio terminal 100 is connected to the base station (base station 103) selected by using the S/N ratios and executes the radio parameter setting process between the radio terminal 100 and the managing apparatus 102 (811, 906). When the setting of the radio parameters is finished, the managing apparatus notifies the base station of the end of the setting mode. When the setting mode end notification is received from the managing apparatus, the base station switches the operating mode to the normal mode. The radio terminal 100 sets the radio communication parameters provided from the managing apparatus 102, is connected to the base station 103 which operates in the normal mode, and can make the data communication.

When "disconnection" is selected by the user who has confirmed the message displayed in 2302, the radio terminal 100 notifies all of the base stations of the overlap (806). The subsequent processes are similar to those in the first embodiment. The processes in the third and fourth embodiments may be executed.

In the above description, when a plurality of base stations in the setting mode is detected, the S/N ratios are compared. However, in a manner similar to the fifth embodiment, when a plurality of base stations in the setting mode is detected ("plural" in 805) in FIG. 13, the base station is selected by using the S/N ratios and the processes of 2300 and subsequent steps may be also executed to the selected base station.

Another information such as a reception field intensity (RSSI) or the like showing the nature of the radio wave may be used in place of the S/N ratios.

As mentioned above, according to the embodiment, after the connection destination was decided, the radio terminal displays the message for allowing the user to select the connection or disconnection based on the flickering pattern of the LED. Thus, the user of the radio terminal can confirm the connection destination by the eyes and a risk that the radio parameters are erroneously set between the radio terminal and the undesirable managing apparatus can be reduced. When there are a plurality of base stations in the setting mode, the confirmation is made by using the LED. Therefore, if there is one base station in the setting mode, the confirmation using the LED is unnecessary and the setting process of the radio parameters can be executed in a short time.

Although the user can confirm by the sense of sight based on the flickering pattern of the LED, a visible device other than the LED or a sound can be also used.

Seventh Embodiment

In the first to sixth embodiments, the radio terminal has detected the base stations in the setting mode (for example, 801 to 804 in FIG. 8). In this embodiment, the managing apparatus searches for the base stations in the setting mode and performs the overlap notification.

Figure 25:
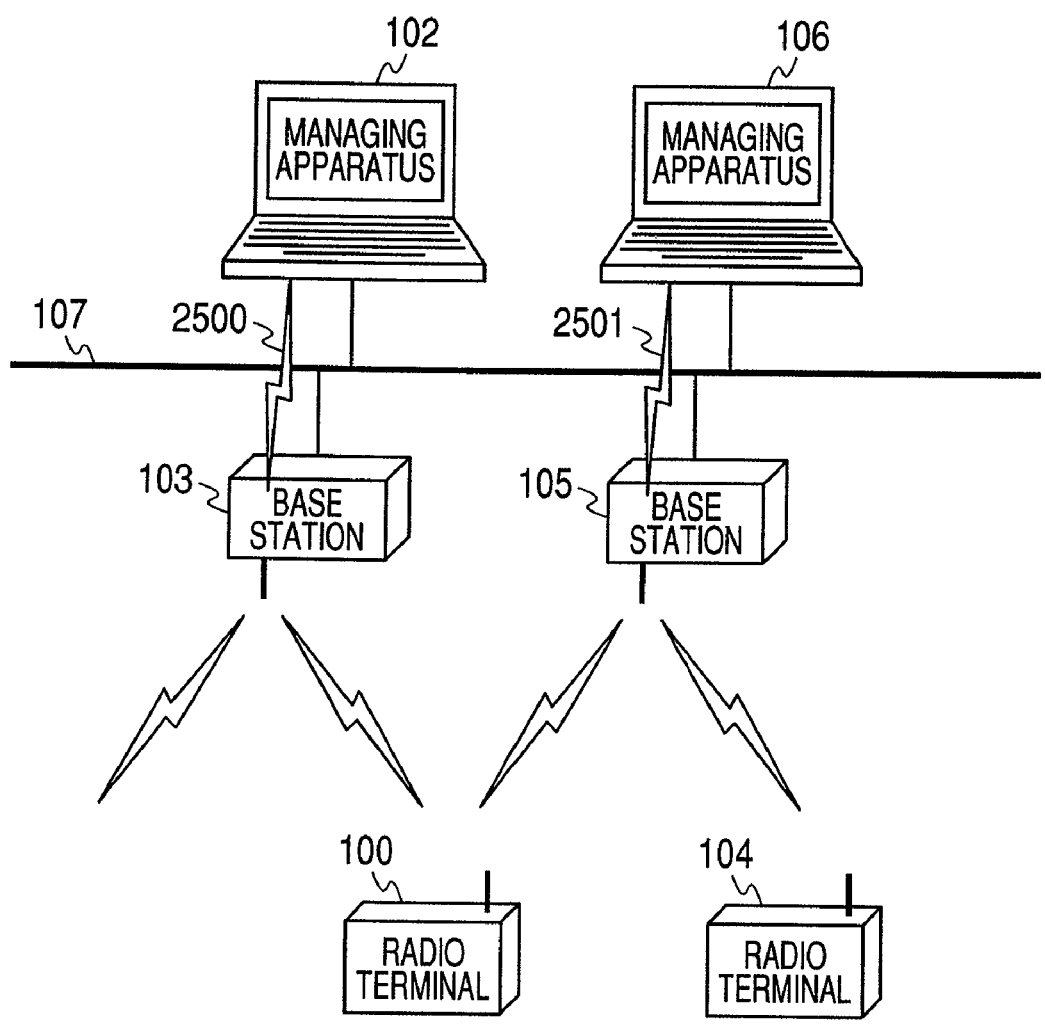
FIG. 25 is a system constructional diagram in the seventh embodiment.

FIG. 25 is a system constructional diagram in the embodiment. The managing apparatus 102 is connected to the base station 103 in a wireless manner (2500). The managing apparatus 106 is connected to the base station 105 in a wireless manner (2501). In the first to sixth embodiments, the base station has the base station information unit 205 (FIG. 5) in the RAM 202. In the embodiment, each of the managing apparatuses 102 and 106 has a similar base station information unit in the RAM 302.

Figure 26:
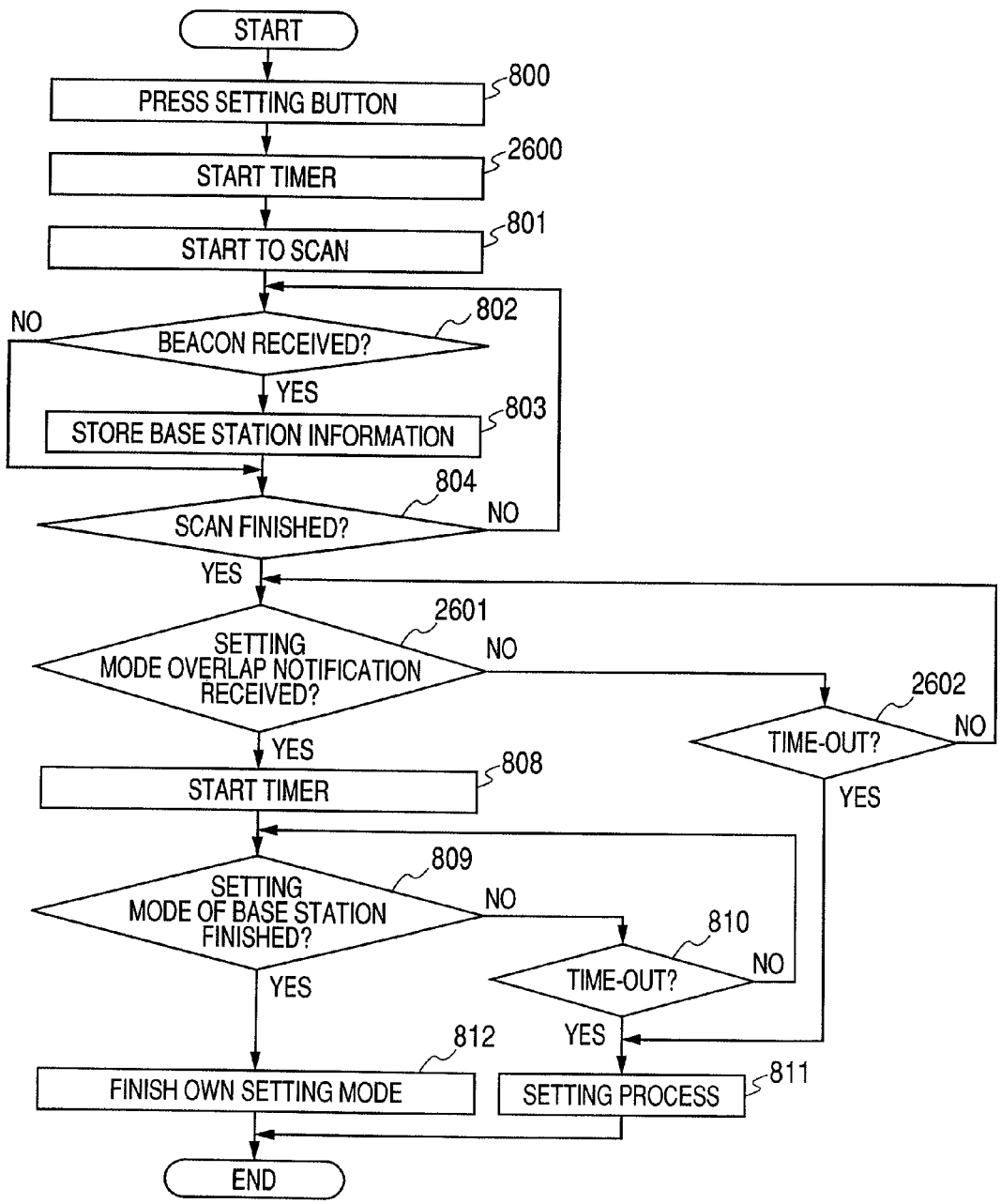
FIG. 26 is a flowchart of a radio terminal in the seventh embodiment.
Figure 27:
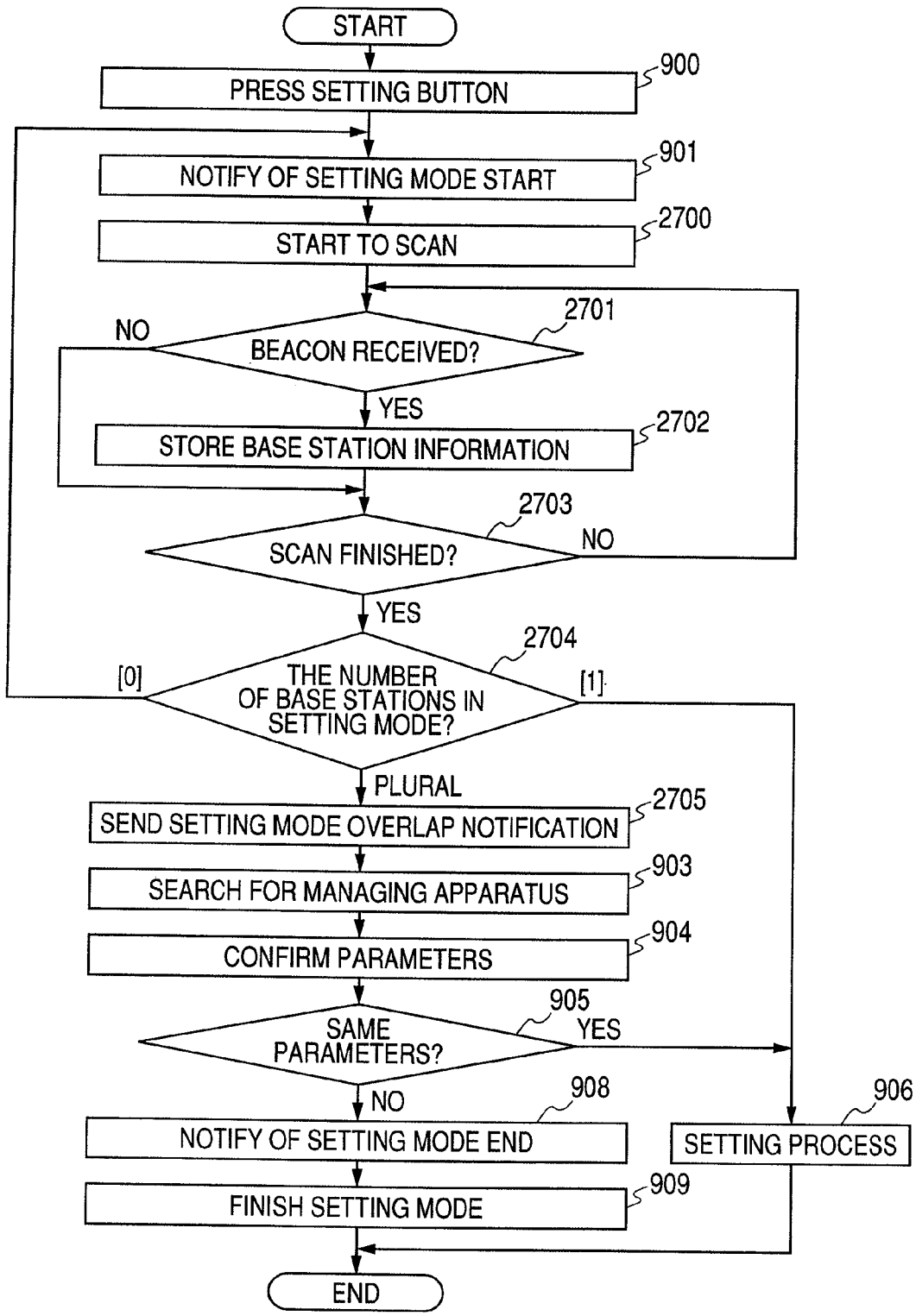
FIG. 27 is a flowchart of a managing apparatus in the seventh embodiment.

FIG. 26 is a flowchart showing the operation of the radio terminal in the embodiment. This processing flow is executed by the CPU 200 according to the programs stored in the ROM 201. FIG. 27 is a flowchart showing the operation of the managing apparatus in the embodiment. This processing flow is executed by the CPU 300 according to the programs stored in the ROM 301. The portions which have already been described are designated by the same reference numerals and their description is omitted.

When the setting button 304 is pressed (900), the managing apparatus 102 notifies the base station 103 of the start of the setting mode (901) and starts to scan for the predetermined time (2700) in order to search for the base stations in the setting mode. When the setting mode start notification is received, the base station 103 transmits the beacon of the setting mode. When the setting button 304 is pressed, the managing apparatus 106 also notifies the base station 105 of the start of the setting mode. The base station 105 transmits the beacon of the setting mode.

When the beacon of the setting mode is detected (YES in 2701), the managing apparatus 102 stores the information of the detected base station into the base station information unit in the RAM 302 (2702). When the scan is finished (YES in 2703), the managing apparatus 102 discriminates the number of base stations in the setting mode (2704).

If there is one base station in the setting mode ("1" in 2704), the managing apparatus 102 waits for the setting request from the radio terminal. When the setting request is received, the managing apparatus 102 notifies the radio terminal of the radio parameters of the base station 103 and executes the setting process of the radio parameters (906). When the setting of the radio parameters is finished, the managing apparatus notifies the base station of the end of the setting mode. When the setting mode end notification is received, the base station switches the operating mode to the normal mode. The radio terminal 100 sets the radio communication parameters provided from the managing apparatus 102, is connected to the base station 103 which operates in the normal mode, and can make the data communication. If there are no base stations in the setting mode ("0" in 2704), the managing apparatus 102 determines that the setting mode start notification does not reach the base station 103, and notifies again the base station 103 of the start of the setting mode (901).

If a plurality of base stations in the setting mode are detected ("plural" in 2704), the managing apparatus 102 broadcasts the overlap notification through the base station 103. The overlap notification transmitted from the base station 103 is also sent to the radio terminal 100. The overlap notification is also sent to the base station 105 through the wired LAN and is also transmitted from the base station 105 to the managing apparatus 106 and the radio terminal 104.

When the overlap notification is performed, the managing apparatus 102 searches for the managing apparatus (903). The information of the searched managing apparatus is stored into the managing apparatus information unit 305. When the search is finished, the managing apparatus 102 confirms whether or not the radio parameters of another managing apparatus stored in the managing apparatus information unit 305 coincide with the radio parameters which are managed by its own managing apparatus by comparing them (904). If the radio parameters of the searched other managing apparatus coincide with the radio parameters which are managed by its own managing apparatus (YES in 905), the managing apparatus 102 waits for the setting request from the radio terminal. When the setting request is detected, the managing apparatus 102 executes the setting process of the radio parameters between the managing apparatus and the radio terminal (906). In this case, even if the radio terminal sets the radio parameters which are managed by any one of the managing apparatuses, the same radio parameters are set. Therefore, it is unnecessary to finish the setting mode.

If the radio parameters of the searched other managing apparatus differ from the radio parameters which are managed by its own managing apparatus (NO in 905), the managing apparatus 102 notifies the base station 103 of the end of the setting mode (908). The managing apparatus 102 finishes its own setting mode (909). When the setting mode end notification is received, the base station 103 periodically transmits the beacon of the normal mode in which the mode area 400 of the beacon has been set to "0".

When the setting button 203 is pressed (800), the radio terminal 100 starts the timer 206 (2600) and monitors whether or not the overlap notification is received. The timer 206 is a timer for assuring a time which is required until the managing apparatus 102 scans the base station in the setting mode and transmits the overlap notification of the setting mode.

The radio terminal 100 starts to scan for the predetermined time (801) in order to search for the base station which is operating in the setting mode. After the scan was started, the radio terminal 100 receives the beacon (setting mode) transmitted from the base station (802) and stores the information of the base station 103 which will be known from the received beacon into the base station information unit 205 (803). When the scan is finished (YES in 804), the radio terminal 100 discriminates whether or not the overlap notification has been received (2601).

If the time-out of the timer activated in 2600 has occurred in the state where not the overlap notification is not received (NO in 2601, YES in 2602), the radio terminal 100 refers to the base station information unit 205 stored in 803. The radio terminal 100 is connected to the base station in the setting mode and sets the radio communication parameters between the managing apparatus and the radio terminal (811). When the setting of the radio parameters is finished, the managing apparatus notifies the base station of the end of the setting mode. When the setting mode end notification is received from the managing apparatus, the base station switches the operating mode to the normal mode. The radio terminal 100 sets the radio communication parameters provided from the managing apparatus 102, is connected to the base station 103 which is operating in the normal mode, and can make the data communication.

When the overlap notification is received before the time-out of the timer 206 activated in 2600 (YES in 2601), the radio terminal 100 resets the timer 206 and restarts the timer 206 (808). The radio terminal 100 discriminates whether or not the base station finishes the setting mode until the time-out of the timer 206 activated in 808. When the time-out of the timer 206 occurs (YES in 810) without detecting the end of the setting mode of the base station (NO in 809), the radio terminal 100 is connected to the base station which is operating in the setting mode, transmits the setting request to the managing apparatus, and executes the setting process of the radio parameters between the radio terminal and the managing apparatus (811).

When it is detected that the base station which had transmitted the beacon of the setting mode has transmitted the beacon of the normal mode (YES in 809) before the time-out of the timer 206, the radio terminal 100 finishes its own setting mode (812). By referring to the base station information unit 205, the radio terminal 100 discriminates that the base station in the setting mode has been switched to the normal mode and has finished the setting mode.

As mentioned above, according to the embodiment, the overlap of the setting mode can be discriminated on the managing apparatus side without receiving the overlap notification from the radio terminal. Therefore, the process for searching for another managing apparatus (903) can be rapidly started and the time which is required until the setting mode is finished can be shortened.

The managing apparatus 102 may execute the setting mode start notification (901) if it is determined that there are no base stations in the setting mode after the scan (2700 to 2703). In such a case, since the base station 103 is operating in the normal mode at the start of the scan, if it is decided as a result of the scan that at least one base station in the setting mode exists, the radio terminal 100 is notified of the overlap of the setting mode (2705). When the overlap notification is received, the radio terminal finishes its own setting mode.

By using such a construction as mentioned above, in the case of finishing the setting mode, the base station does not need to wastefully transmit the beacon of the setting mode.

It is also possible to construct in such a manner that, on the radio terminal side as well, whether or not a plurality of base stations in the setting mode exists is discriminated and if the time-out of the timer occurs (2602) without receiving the overlap notification in spite of the fact that there are a plurality of base stations in the setting mode, the overlap notification is performed from the radio terminal as in the case of the first embodiment. By using such a construction as mentioned above, the managing apparatus and the base station can more certainly finish the setting mode.

Although each of the above embodiments has been described with respect to the wireless LAN according to the IEEE802.11 as an example, the invention can be also embodied in another wireless medium such as wireless USB, MBOA (Multi Band OFDM Alliance), Bluetooth (registered trademark), or the like.

Although each of the above embodiments has been described with respect to the example in which the network identifier, encrypting system, and encryption key is used as radio parameters, other information such as authenticating system, authentication key, and the like may be included in the radio parameters.

According to the first to seventh embodiments as mentioned above, the managing apparatus and the base station can finish the setting mode in a shorter time.

Even if there are a plurality of managing apparatuses in the setting mode, when the radio parameters which are managed by the managing apparatuses in the setting mode coincide, the radio parameters can be set.

Therefore, the occurrence of such a situation that the wrong communication parameters are set into the communicating apparatus can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-286469, filed Oct. 20, 2006, which is hereby incorporated by reference herein in its entirety.

The invention claimed is:

1. A method of sharing wireless communication parameters for wirelessly communicating with a base station, wherein the wireless communication parameters are shared between at least one managing apparatus for managing the wireless communication parameters and at least one communicating apparatus for wirelessly communicating with the base station using the wireless communication parameters, the method comprising:
a detecting step of detecting, at either one of a first communicating apparatus and a first managing apparatus, a managing apparatus, wherein said one of the first communicating apparatus and the first managing apparatus, and the managing apparatus, are operating in a setting mode,
wherein with respect to the first communicating apparatus, the setting mode is for receiving the wireless communication parameters from the managing apparatus, and wherein with respect to the first managing apparatus and the managing apparatus, the setting mode is for providing the wireless communication parameters to the communicating apparatus;
a comparing step of, if a plurality of managing apparatuses operating in the setting mode are detected in the detecting step, making, at the first managing apparatus, a comparison between the wireless communication parameters managed by the plurality of managing apparatuses operating in the setting mode, so as to obtain a comparison result; and
a controlling step of controlling processing by selectively continuing or stopping the setting mode in said one of the first communicating apparatus and the first managing apparatus according to whether or not the wireless communication parameters managed by the plurality of managing apparatuses operating in the setting mode are the same.

2. A method according to claim 1, further comprising a notifying step of notifying the plurality of managing apparatuses operating in the setting mode that the plurality of managing apparatuses operating in the setting mode exist, if the plurality of managing apparatuses operating in the setting mode are detected in the detecting step.

3. A method according to claim 1, further comprising a displaying step of displaying a message for urging a user to reset the setting mode, when the setting mode is stopped in the controlling step.

4. A method according to claim 3, wherein if the setting mode is set again, the providing and receiving of the wireless communication parameters is executed between one of the plurality of managing apparatuses operating in the setting mode which has been detected first and the first communicating apparatus.

5. A method according to claim 1, wherein the comparison in the comparing step is based on a signal transmitted from the base station.

6. A method according to claim 5, further comprising a selecting step of, selecting, from among the plurality of managing apparatuses operating in the setting mode, the managing apparatus for providing the wireless communication parameters to the first communicating apparatus based on a receiving state of the signal from the base station, when the plurality of managing apparatuses operating in the setting mode are detected in the detecting step.

7. A method according to claim 5, further comprising:

a deciding step of deciding whether or not the managing apparatus for providing the wireless communication parameters to the first communicating apparatus is to be selected based on a receiving state of the signal from the base station, when the plurality of managing apparatuses in the setting mode are detected in the detecting step; and a notifying step of notifying the plurality of managing apparatuses operating in the setting mode that the plurality of managing apparatuses operating in the setting mode exist, according to the decision in the deciding step.

8. A method according to claim 6, wherein the selecting step is executed in the first communicating apparatus, and the method further comprises displaying a message for making the managing apparatus selected in the selecting step correspond to the first communicating apparatus which has selected the managing apparatus.

9. A managing apparatus, comprising:

a managing device that manages wireless communication parameters comprising at least one of an encrypting system, an encryption key, an authenticating system and an authentication key;

a detecting device that detects another managing apparatus that is operating in a setting mode for providing the wireless communication parameters to a communication apparatus, while the managing apparatus is operating in the setting mode;

a comparing device that compares the wireless communication parameters managed by the other managing apparatus operating in the setting mode detected by the detecting device and the wireless communication parameters managed by the managing device; and a discriminating device that discriminates whether or not the setting mode of the managing apparatus is to be continued according to whether or not the wireless communication parameters managed by the managing device corresponds to the wireless communication parameters managed by the other managing apparatus.

10. A managing apparatus according to claim 9, further comprising a notifying device that notifies a base station serving as a management target of the managing apparatus of a continuation of the setting mode or an end of the setting mode.

11. A managing apparatus according to claim 10, further comprising a requesting device that requests the base station to change contents of a signal transmitted from the base station.

12. A managing apparatus according to claim 9, wherein the detecting device detects the other managing apparatus based on a notification from the communicating apparatus.

13. A managing apparatus according to claim 10, wherein the detecting device detects the other managing apparatus based on a signal from the base station.

* * * * *